(12) United States Patent
Shikata et al.

(10) Patent No.: US 10,699,473 B2
(45) Date of Patent: Jun. 30, 2020

(54) SYSTEM AND METHOD FOR GENERATING A VIRTUAL VIEWPOINT APPARATUS

(71) Applicant: CANON KABUSHIKI KAISHA, Tokyo (JP)

(72) Inventors: Yasushi Shikata, Tama (JP); Kazuhiro Matsubayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/892,209

(22) Filed: Feb. 8, 2018

(65) Prior Publication Data
US 2018/0232943 A1 Aug. 16, 2018

(30) Foreign Application Priority Data
Feb. 10, 2017 (JP) .................................. 2017-022717

(51) Int. Cl.
| | | |
|---|---|---|
| *G06T 15/20* | (2011.01) | |
| *H04N 21/218* | (2011.01) | |
| *H04N 21/234* | (2011.01) | |
| *H04N 5/222* | (2006.01) | |
| *H04N 21/81* | (2011.01) | |
| *H04N 21/6587* | (2011.01) | |

(Continued)

(52) U.S. Cl.
CPC .............. *G06T 15/205* (2013.01); *G06T 7/11* (2017.01); *G06T 7/194* (2017.01); *G06T 7/62* (2017.01); *G06T 7/70* (2017.01); *H04N 5/2226* (2013.01); *H04N 5/2258* (2013.01); *H04N 5/23203* (2013.01); *H04N 5/23293* (2013.01); *H04N 5/232061* (2018.08); *H04N 13/111* (2018.05); *H04N 21/21805* (2013.01);

*H04N 21/23412* (2013.01); *H04N 21/23418* (2013.01); *H04N 21/6587* (2013.01); *H04N 21/8146* (2013.01); *H04N 5/247* (2013.01)

(58) Field of Classification Search
CPC ......... G06T 15/205; G06T 7/62; G06T 7/194; G06T 7/11; G06T 7/70; H04N 13/111; H04N 5/232061; H04N 5/2226; H04N 5/2258; H04N 5/23203; H04N 5/23293; H04N 5/247; H04N 21/21805; H04N 21/23412; H04N 21/23418; H04N 21/6587; H04N 21/8146
USPC ......................................................... 348/264
See application file for complete search history.

(56) References Cited

U.S. PATENT DOCUMENTS

| | | | |
|---|---|---|---|
| 6,144,375 A | 11/2000 | Jain | |
| 8,243,122 B2 * | 8/2012 | Ishikawa | G06T 15/205 |
| | | | 348/39 |

(Continued)

FOREIGN PATENT DOCUMENTS

| | | |
|---|---|---|
| CN | 101046848 A | 10/2007 |
| CN | 103069814 A | 4/2013 |

(Continued)

*Primary Examiner* — Pritham D Prabhakher
(74) *Attorney, Agent, or Firm* — Canon U.S.A., Inc. IP Division

(57) ABSTRACT

A system for generating a virtual viewpoint image based a plurality of captured images obtained by a plurality of image capturing apparatuses includes a separation unit configured to separate an image of an object from one or more captured images among the plurality of captured images obtained by the plurality of image capturing apparatuses, and a display control unit configured to display on a display screen the separated image of the object.

22 Claims, 26 Drawing Sheets

(51) Int. Cl.
*H04N 5/232* (2006.01)
*H04N 13/111* (2018.01)
*H04N 5/225* (2006.01)
*G06T 7/62* (2017.01)
*G06T 7/194* (2017.01)
*G06T 7/11* (2017.01)
*G06T 7/70* (2017.01)
*H04N 5/247* (2006.01)

(56) References Cited

U.S. PATENT DOCUMENTS

| | | | | |
|---|---|---|---|---|
| 8,634,675 | B2* | 1/2014 | Cho | H04N 13/111 |
| | | | | 382/276 |
| 9,117,113 | B2* | 8/2015 | Popa | G06K 9/00342 |
| 9,117,310 | B2* | 8/2015 | Coene | G06T 15/205 |
| 9,378,583 | B2* | 6/2016 | Lee | G06T 15/205 |
| 9,836,870 | B2* | 12/2017 | Smith | H04N 13/243 |
| | | | | 13/243 |
| 9,877,011 | B2* | 1/2018 | Fujii | B60R 1/00 |
| 10,089,740 | B2* | 10/2018 | Srikanth | H04N 5/23216 |
| 2002/0113865 | A1* | 8/2002 | Yano | G06T 17/10 |
| | | | | 348/47 |
| 2005/0018045 | A1* | 1/2005 | Thomas | G06K 9/209 |
| | | | | 348/157 |
| 2008/0192116 | A1* | 8/2008 | Tamir | G06T 7/292 |
| | | | | 348/157 |
| 2009/0128548 | A1 | 5/2009 | Gloudemans | |
| 2009/0315978 | A1* | 12/2009 | Wurmlin | G06T 5/005 |
| | | | | 348/43 |
| 2012/0001902 | A1* | 1/2012 | Lee | G06T 15/205 |
| | | | | 345/419 |
| 2012/0033872 | A1* | 2/2012 | Cho | H04N 13/111 |
| | | | | 382/154 |
| 2013/0016097 | A1 | 1/2013 | Coene | |
| 2013/0176438 | A1 | 7/2013 | Mate | |
| 2014/0098183 | A1* | 4/2014 | Smith | H04N 7/157 |
| | | | | 348/14.16 |
| 2014/0219550 | A1* | 8/2014 | Popa | G06K 9/00342 |
| | | | | 382/154 |
| 2015/0178988 | A1* | 6/2015 | Montserrat Mora | G06T 13/40 |
| | | | | 345/420 |
| 2015/0254868 | A1* | 9/2015 | Srikanth | H04N 5/23216 |
| | | | | 348/47 |
| 2016/0065944 | A1* | 3/2016 | Fujii | B60R 1/00 |
| | | | | 348/47 |
| 2016/0198146 | A1* | 7/2016 | Hayasaka | H04N 13/282 |
| | | | | 348/48 |
| 2016/0205341 | A1* | 7/2016 | Hollander | G06T 7/20 |
| | | | | 375/240.08 |
| 2016/0316170 | A1* | 10/2016 | Smith | H04N 13/257 |
| 2017/0148222 | A1* | 5/2017 | Holzer | H04N 13/243 |
| 2017/0148223 | A1* | 5/2017 | Holzer | H04N 5/265 |
| 2017/0263057 | A1* | 9/2017 | Hong | G06T 19/20 |

FOREIGN PATENT DOCUMENTS

| | | |
|---|---|---|
| CN | 103985114 A | 8/2014 |
| CN | 104660985 A | 5/2015 |
| CN | 105612552 A | 5/2016 |
| JP | 2001094969 A | 4/2001 |
| JP | 2012257021 A | 12/2012 |
| JP | 2014236896 A | 12/2014 |
| JP | 5874626 B2 | 3/2016 |
| WO | 2015087730 A1 | 6/2015 |

* cited by examiner

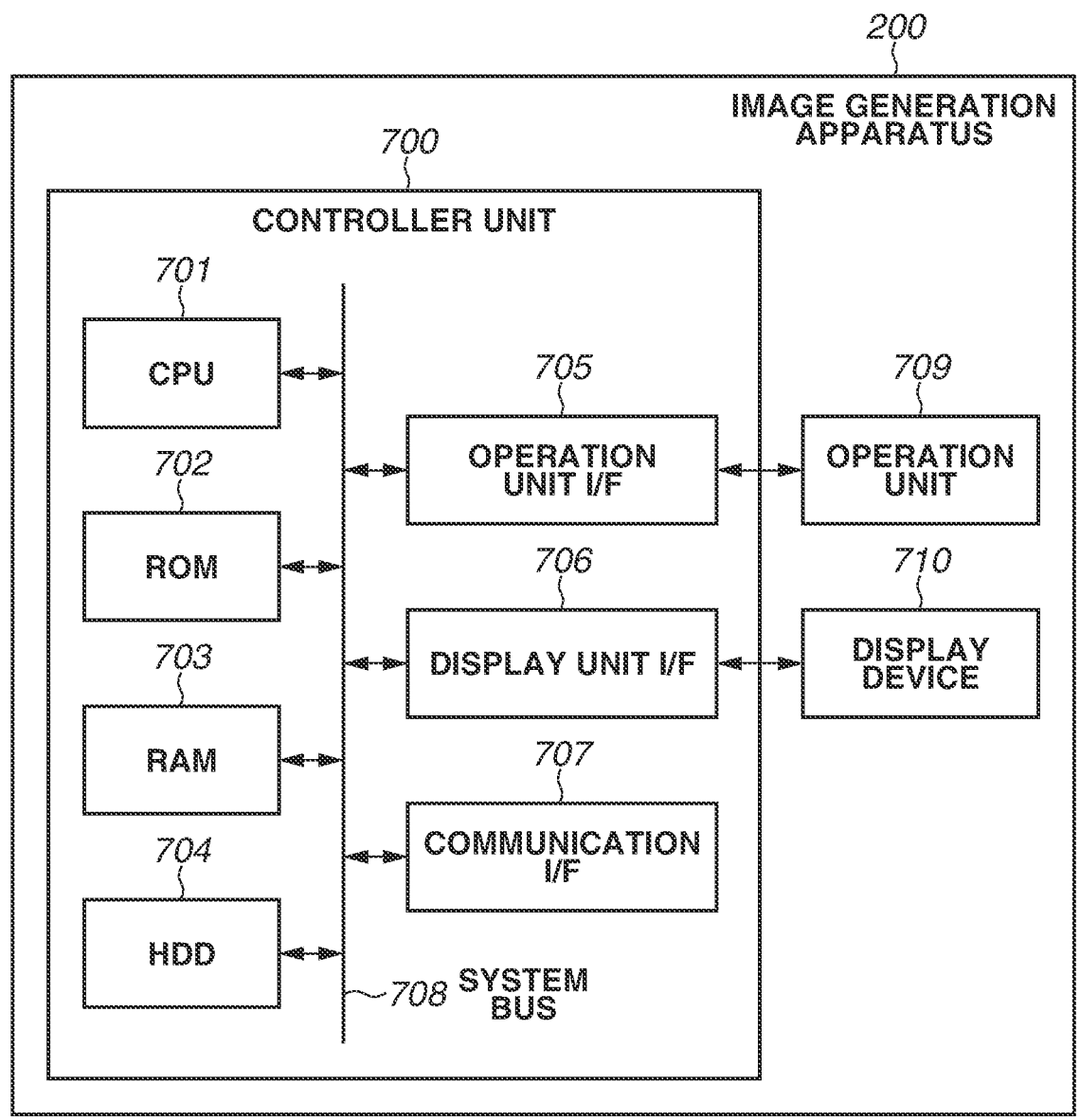

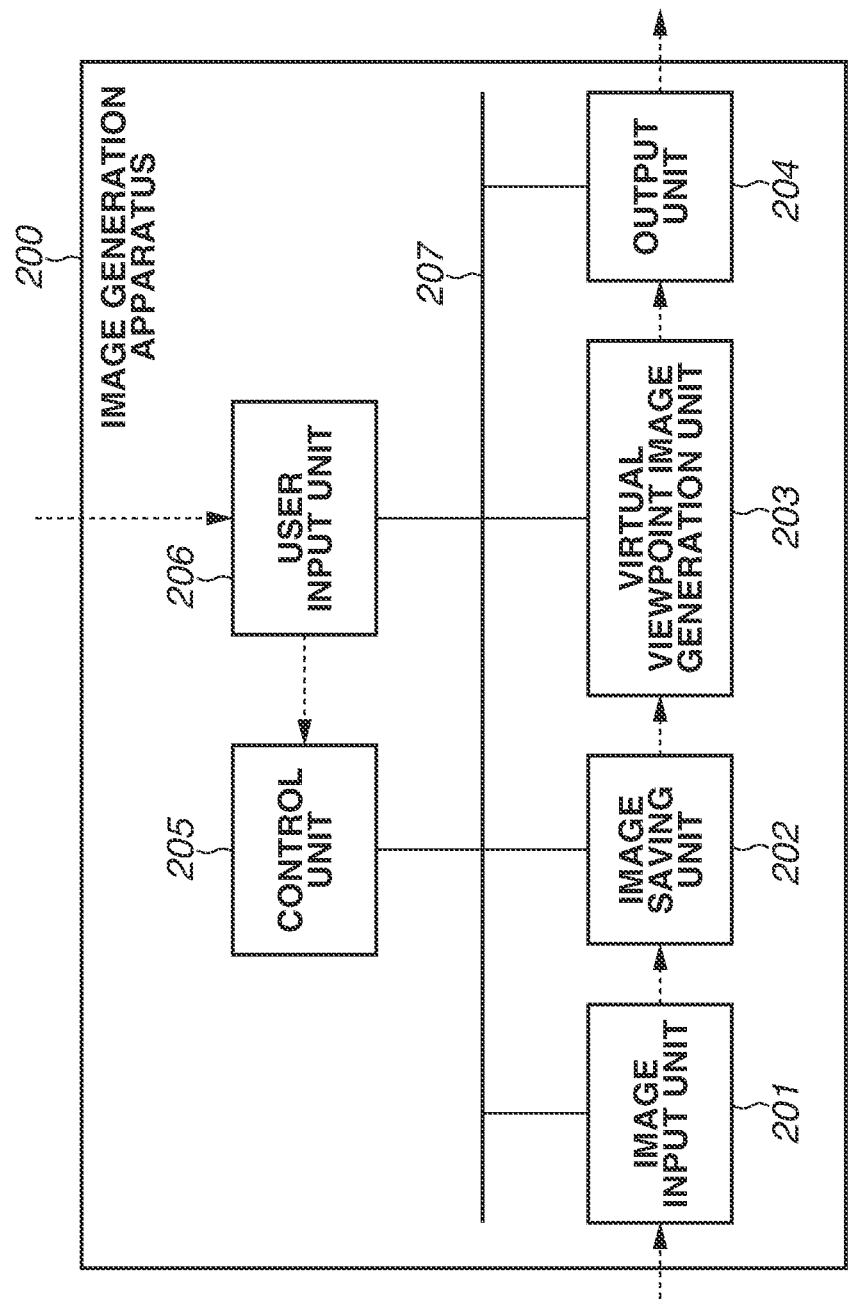

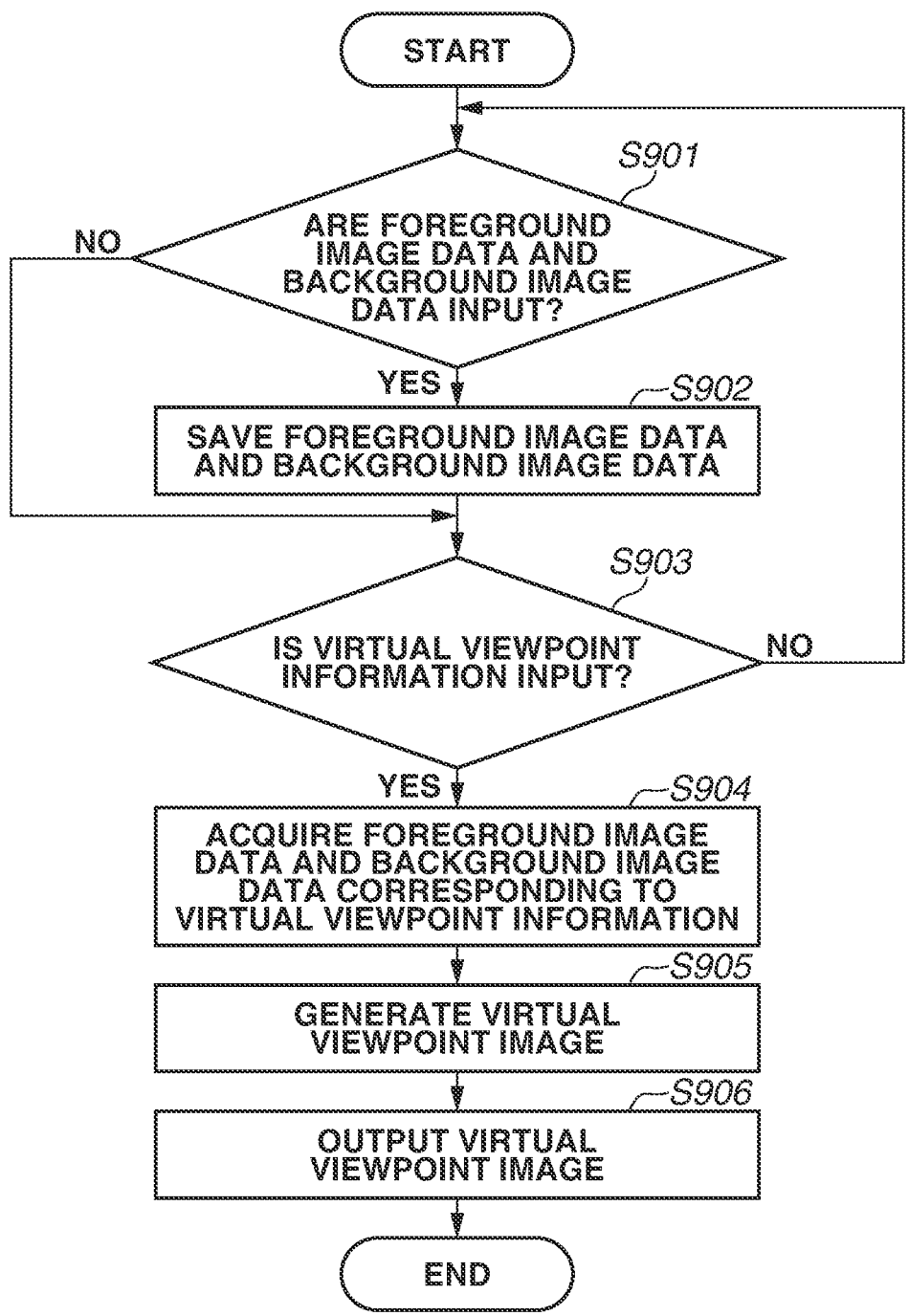

FIG.21

| FOREGROUND TYPE | FOREGROUND IDENTIFICATION INFORMATION | COORDINATES (x, y) |
|---|---|---|
| COMPARISON SOURCE | FOREGROUND 2 | (800, 1000) |
| COMPARISON DESTINATION | FOREGROUND 1 | (840, 950) |
| COMPARISON DESTINATION | FOREGROUND 3 | (2000, 1600) |

SYSTEM AND METHOD FOR GENERATING A VIRTUAL VIEWPOINT APPARATUS

BACKGROUND OF THE INVENTION

Field of the Invention

The present invention relates to a system and method for generating a virtual viewpoint image based on a plurality of captured images obtained by a plurality of image capturing apparatuses.

Description of the Related Art

In recent years, the following technique has been drawing attention. It is a technique in which a plurality of image capturing apparatuses are installed at different positions and capture images of an object in synchronization with each other. Using the images from a plurality of viewpoints obtained by the image capturing, not only an image at the installation position of each image capturing apparatus but also an image from any viewpoint is generated as a virtual viewpoint image.

The virtual viewpoint image based on the images from the plurality of viewpoints can be generated and viewed as follows. First, images captured by the plurality of image capturing apparatuses are aggregated in an image generation apparatus such as a server. Then, the image generation apparatus performs processing such as rendering based on a virtual viewpoint, using the images captured by the plurality of image capturing apparatuses, thereby generating a virtual viewpoint image. Then, the image generation apparatus displays the virtual viewpoint image on a viewing terminal of a user.

Using such a virtual viewpoint image, for example, the image generation apparatus generates, from images obtained by capturing a soccer game or a basketball game, a virtual viewpoint image according to a viewpoint specified by an image content producer and thereby can produce a content from an impressive viewpoint. Further, the user viewing the content can freely move the viewpoint using a controller included in the viewing terminal or a tablet, and the image generation apparatus displays a virtual viewpoint image according to the moved viewpoint. In this way, the user can watch the game from the user's desired viewpoint. Thus, a service using a virtual viewpoint image can make the user feel as if the user were in the scene, as compared with a conventional captured image.

Meanwhile, the image quality of a virtual viewpoint image depends largely on the image quality of an "object to be gazed at". For example, in the case of a soccer game or a basketball game, the "object to be gazed at" is a player or a ball. To enhance the image quality of such an "object to be gazed at", it is necessary to monitor captured images of cameras from which images of the "object to be gazed at" are obtained, and confirm that an abnormality does not exist in or around the "object to be gazed at". Specifically, for example, it is necessary to confirm that an obstacle such as a cheering flag does not appear on the "object to be gazed at", or whether the "object to be gazed at" is in an appropriate exposure state.

As a technique for confirming an object to be gazed at, Japanese Patent Application Laid-Open No. 2014-236896 is known. In a system discussed in Japanese Patent Application Laid-Open No. 2014-236896, first, from a captured image obtained by capturing a watching target person as an object to be gazed at, the watching target person is extracted as a foreground image. Then, based on information regarding the difference in depth between the foreground image and a background image, the position and the behavior of the watching target person are estimated.

In the system in Japanese Patent Application Laid-Open No. 2014-236896, however, the position and the behavior of the object to be gazed at are merely monitored. Thus, in the system discussed in Japanese Patent Application Laid-Open No. 2014-236896, in a case where many image capturing apparatuses are installed, and a plurality of objects are present in captured images as in a system for generating a virtual viewpoint image, it is not easy to monitor, for example, the presence or absence of an obstacle, or the occurrence of overexposure or underexposure with low load and high accuracy.

SUMMARY OF THE INVENTION

According to an aspect of the present invention, a control apparatus for, in a system for generating a virtual viewpoint image based on an image of an object detected from a plurality of captured images obtained by a plurality of cameras and on a virtually set viewpoint, controlling one or more cameras among the plurality of cameras includes an acquisition unit configured to acquire an image of an object detected from one or more captured images among the plurality of captured images obtained by the plurality of cameras, a display control unit configured to display on a display screen the image of the object acquired by the acquisition unit, and an output unit configured to, in response to a user operation on the display screen on which the image of the object is displayed, output a signal for changing settings of one or more cameras among the plurality of cameras.

Further features of the present invention will become apparent from the following description of embodiments with reference to the attached drawings.

BRIEF DESCRIPTION OF THE DRAWINGS

FIG. 7 is a block diagram illustrating a hardware configuration of an image generation apparatus.

FIG. 8 is a block diagram illustrating a first example of a functional configuration of the image generation apparatus.

FIG. 9 is a flowchart illustrating an operation of the image generation apparatus.

FIG. 21 is a diagram illustrating two-dimensional arrangement information.

DESCRIPTION OF THE EMBODIMENTS

Embodiments of the present invention will be described below with reference to the drawings.

First, a first embodiment will be described. The present embodiment is illustrated taking as an example a case where only pieces of foreground image data are transmitted from image capturing apparatuses to an image monitoring apparatus, and the image monitoring apparatus displays foreground image data with respect to each image capturing apparatus.

Figure 1:
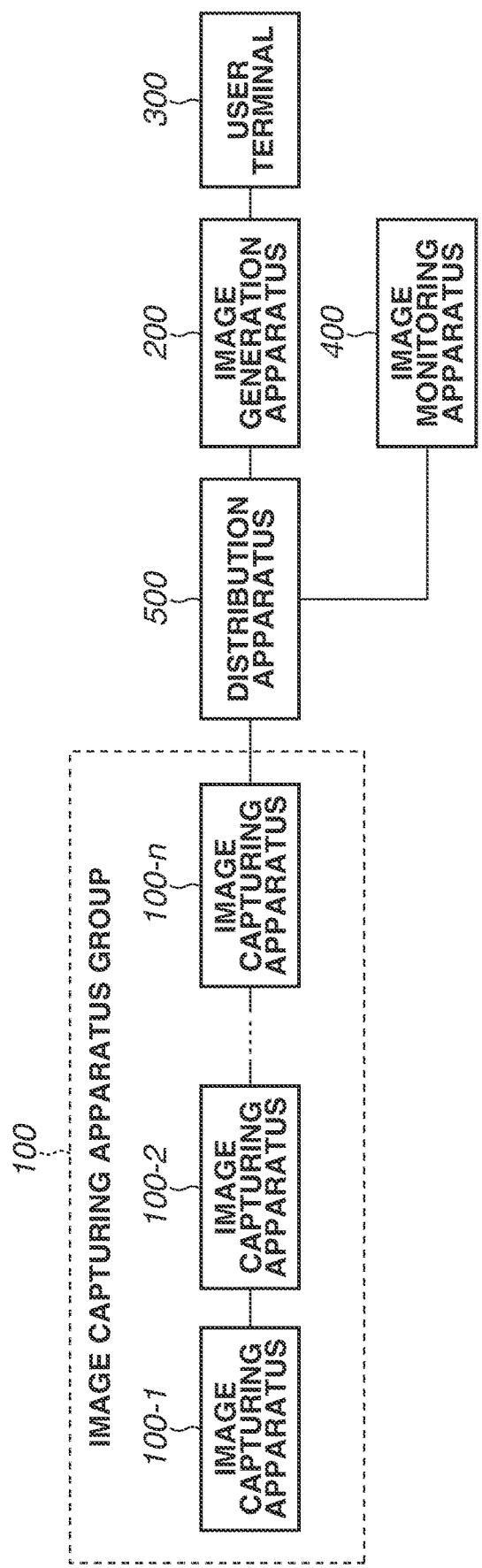
FIG. 1 is a block diagram illustrating a configuration of an image monitoring system.

FIG. 1 is a block diagram illustrating an example of a configuration of an image monitoring system according to the present embodiment. The image monitoring system according to the present embodiment includes an image capturing apparatus group 100, which includes a plurality of image capturing apparatuses 100-1, 100-2, . . . , and 100-n, an image generation apparatus 200, a user terminal 300, an image monitoring apparatus 400, and a distribution apparatus 500. These apparatuses are connected to each other via transmission cables for transmitting an image and control information, so that the apparatuses can communicate with each other. Specific examples of the transmission cables include those based on Gigabit Ethernet (GbE) and 10 GbE compliant with the Institute of Electrical and Electronics Engineers (IEEE) standards for Ethernet (registered trademark). The transmission cables, however, are not limited to these, and may be other types of cables. Alternatively, the apparatuses may wirelessly communicate with each other.

The image capturing apparatus group 100 includes n image capturing apparatuses (the image capturing apparatuses 100-1, 100-2, . . . , and 100-n). In the following description, the image capturing apparatuses 100-1, 100-2, . . . , and 100-n will be referred to as "image capturing apparatuses 100-x" unless a particular image capturing apparatus is indicated.

Image capturing apparatuses 100-x at positions adjacent to each other are connected to each other via a transmission cable. Each image capturing apparatus 100-x transmits a captured image and meta-information accompanying the captured image to the image generation apparatus 200 and the image monitoring apparatus 400. In FIG. 1, the image capturing apparatus 100-1 is connected to the image capturing apparatus 100-2. Further, the image capturing apparatus 100-2 is connected to, in addition to the image capturing apparatus 100-1, another image capturing apparatus (not illustrated) at a position adjacent to the image capturing apparatus 100-2. Then, the image capturing apparatus 100-n is connected to an image capturing apparatus (not illustrated) at a position adjacent to the image capturing apparatus 100-n. Further, the image capturing apparatus 100-n is connected to the distribution apparatus 500.

Figure 2:
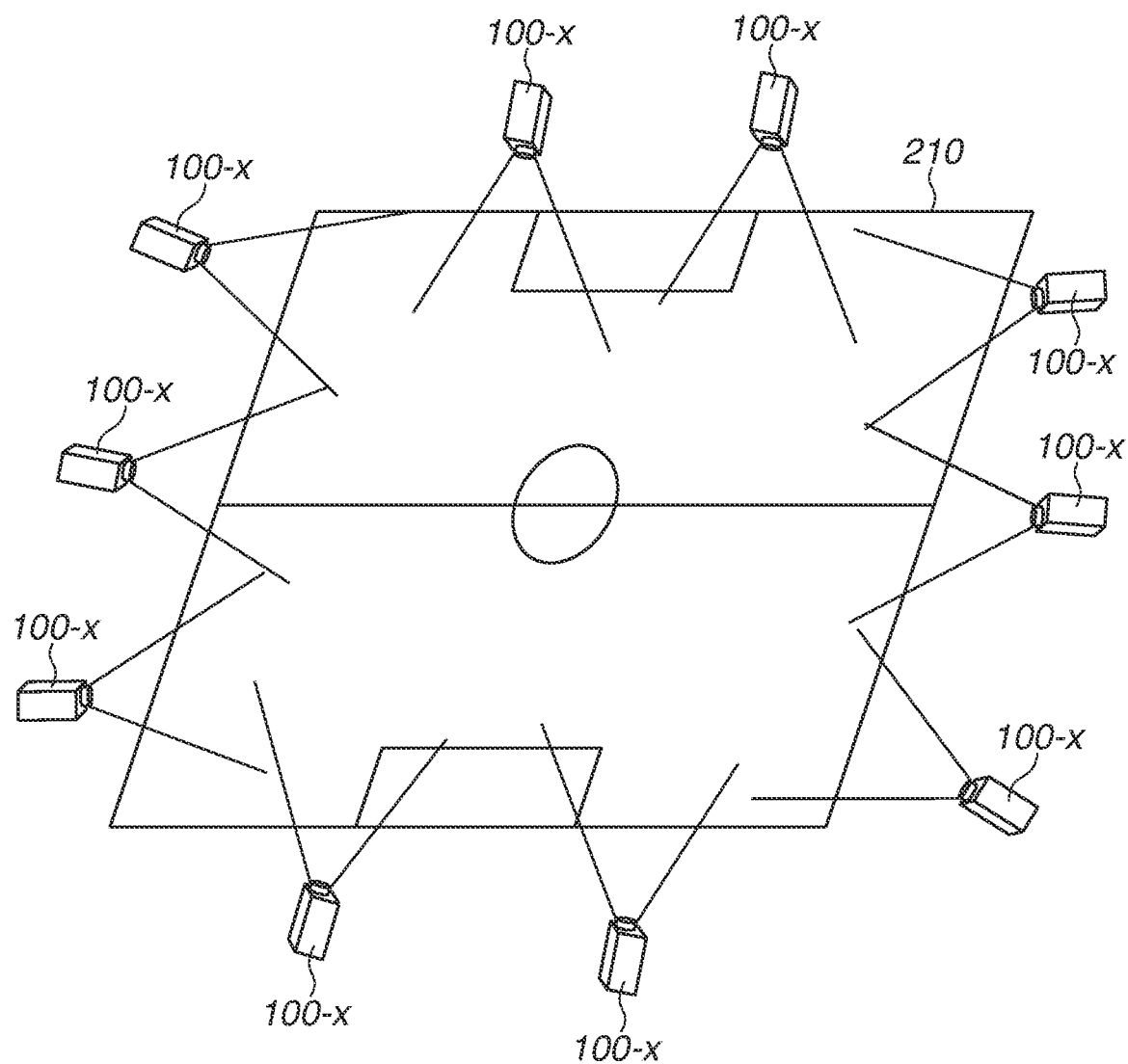
FIG. 2 is a diagram illustrating arrangement of image capturing apparatuses.

The image capturing apparatuses 100-x are arranged to surround a playing field such as a soccer field, and a particular object. FIG. 2 is a diagram illustrating an example of the arrangement of the image capturing apparatuses 100-x. In the example illustrated in FIG. 2, the plurality of image capturing apparatuses 100-x are arranged so that an entire range or a partial range of a playing field 210 such as a soccer field can be captured by the plurality of image capturing apparatuses 100-x.

The plurality of image capturing apparatuses 100-x are, for example, digital cameras, and based on a synchronization signal from an external synchronization apparatus (not illustrated), capture images at the same timing. The images captured by the image capturing apparatuses 100-x are transmitted to the image generation apparatus 200 and the image monitoring apparatus 400 through the distribution apparatus 500 via the transmission cables. Each image capturing apparatus 100-x may be a camera for capturing a still image, or a camera for capturing a moving image, or a camera for capturing both a still image and a moving image.

The image generation apparatus 200 is connected to the image capturing apparatuses 100-x via the distribution apparatus 500. Further, the image generation apparatus 200 is also connected to the user terminal 300. The image generation apparatus 200 accumulates images captured by the image capturing apparatuses 100-x. When virtual viewpoint information based on an operation on the user terminal 300 is input to the image generation apparatus 200, the image generation apparatus 200 generates a virtual viewpoint image corresponding to the virtual viewpoint information, using the images captured by the plurality of image capturing apparatuses 100-x. The image generation apparatus 200 transmits the generated virtual viewpoint image to the user terminal 300. In this case, the virtual viewpoint information at least includes position information and direction information. The position information is information indicating a position relative to a predetermined position such as the center of the captured playing field 210 (e.g., a position in a front-back direction, a left-right direction, and an up-down direction based on the predetermined position). The direction information is information indicating a direction from the predetermined position (e.g., the angles from axes in a three-dimensional orthogonal coordinate system where the predetermined position is the origin, and the front-back direction, the left-right direction, and the up-down direction are the axes).

The image generation apparatus 200 is, for example, a server apparatus and has a database function (an image saving unit 202) and an image processing function (a virtual viewpoint image generation unit 203). A database used by the image generation apparatus 200 holds, as background image data in advance, an image obtained by capturing in advance the scene of a playing field in the state where no object is present, such as the scene of the playing field before the start of a game.

The user terminal 300 includes a controller for an operation. Based on an operation of a user on the controller, the user terminal 300 receives, for example, an instruction to move a display position, change a display direction, or switch a viewpoint, and transmits a transmission signal indicating the content of the instruction to the image generation apparatus 200. Further, the user terminal 300 displays, on a display screen included in the user terminal 300, a virtual viewpoint image received from the image generation apparatus 200. The virtual viewpoint image may be a still image or a moving image. In this case, the user terminal 300 is, for example, a personal computer (PC) or a tablet. The controller includes at least one of, for example, a mouse, a keyboard, a six-axis controller, and a touch panel. The user operates these controllers.

The image monitoring apparatus 400 is connected to the image capturing apparatuses 100-x via the distribution apparatus 500. The image monitoring apparatus 400 receives captured images captured by the image capturing apparatuses 100-x and displays the captured images on a display screen (a display unit 403). Normally, a person in charge of monitoring watches over the image monitoring apparatus 400. The person in charge of monitoring steadily monitors the states of the image capturing apparatus group 100 and the image generation apparatus 200, using the captured images displayed on the display screen.

The distribution apparatus 500 distributes the same captured image from each image capturing apparatus 100-x to the image generation apparatus 200 and the image monitoring apparatus 400.

Next, an example of the configuration of each image capturing apparatus 100-x is described.

Figure 3:
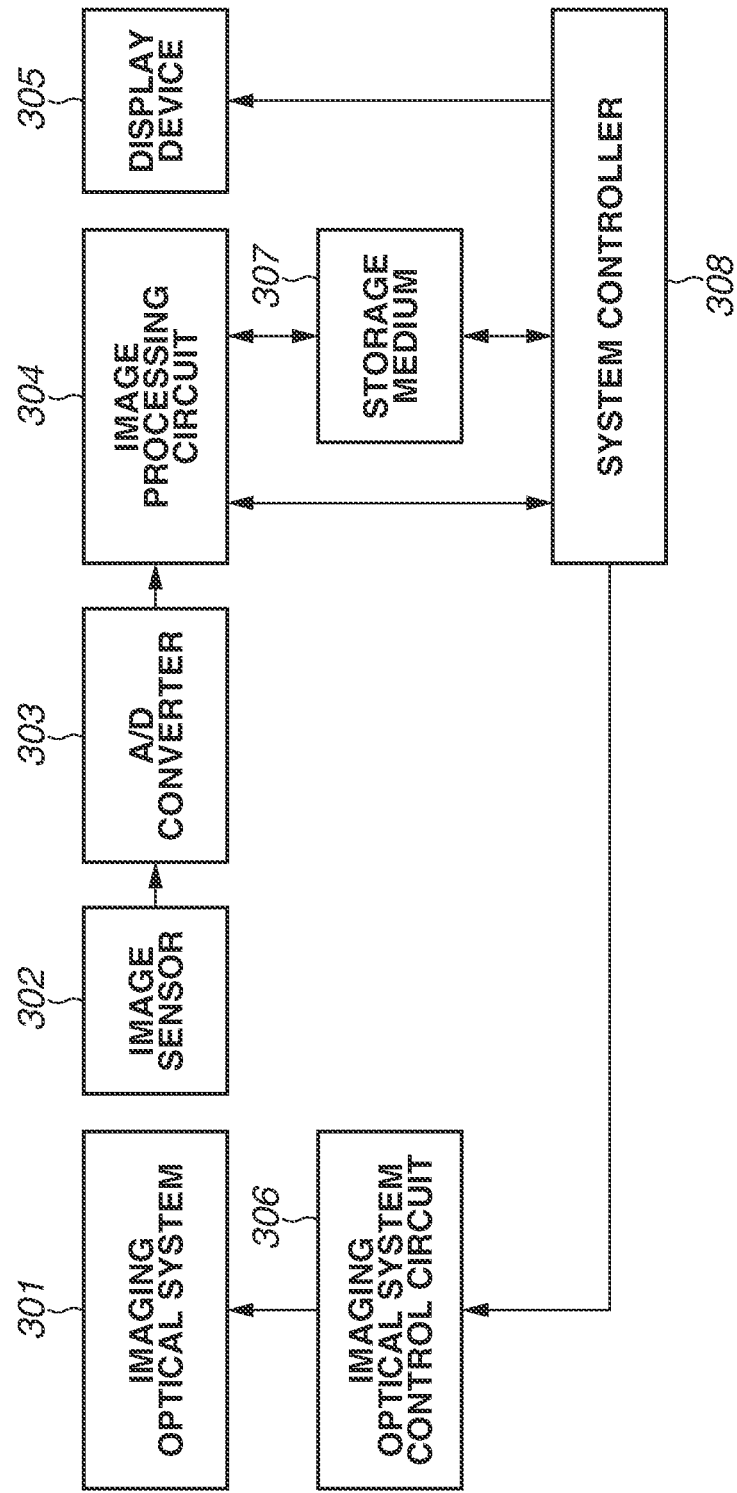
FIG. 3 is a block diagram illustrating a hardware configuration of each image capturing apparatus.

FIG. 3 is a block diagram illustrating an example of the hardware configuration of each image capturing apparatus 100-x.

An imaging optical system 301 (an optical lens system) forms on an image sensor 302 an image of light from an object. The formed image of light is converted into an electric signal by the image sensor 302, and the electric signal is converted into a digital signal by an analog-to-digital (A/D) converter 303. Then, the digital signal is input to an image processing circuit 304. The image sensor 302 is a photoelectric conversion element for converting an optical signal resulting from an image formed on a light-receiving surface into an electric signal with respect to each light-receiving pixel at a corresponding position.

A system controller 308 includes, for example, a central processing unit (CPU), a read-only memory (ROM), and a random-access memory (RAM). The system controller 308 executes a computer program stored in the ROM, thereby controlling the image capturing apparatus 100-x.

The image processing circuit 304 performs various types of image processing on a digital signal (an image signal) input from the A/D converter 303. The image processing includes, for example, white balance adjustment, color correction, and gamma correction. The image signal subjected to the image processing by the image processing circuit 304 is saved in a storage medium 307 or displayed on a display device 305. Further, the image processing circuit 304 executes the process of extracting an object such as a player from an image captured during a game in the playing field 210 among captured images (raw images) input from an image capturing unit 102.

Based on a control signal from the system controller 308, an imaging optical system control circuit 306 drives a lens included in the imaging optical system 301. The display device 305 is not an essential component in the image capturing apparatus 100-x.

Figure 4:
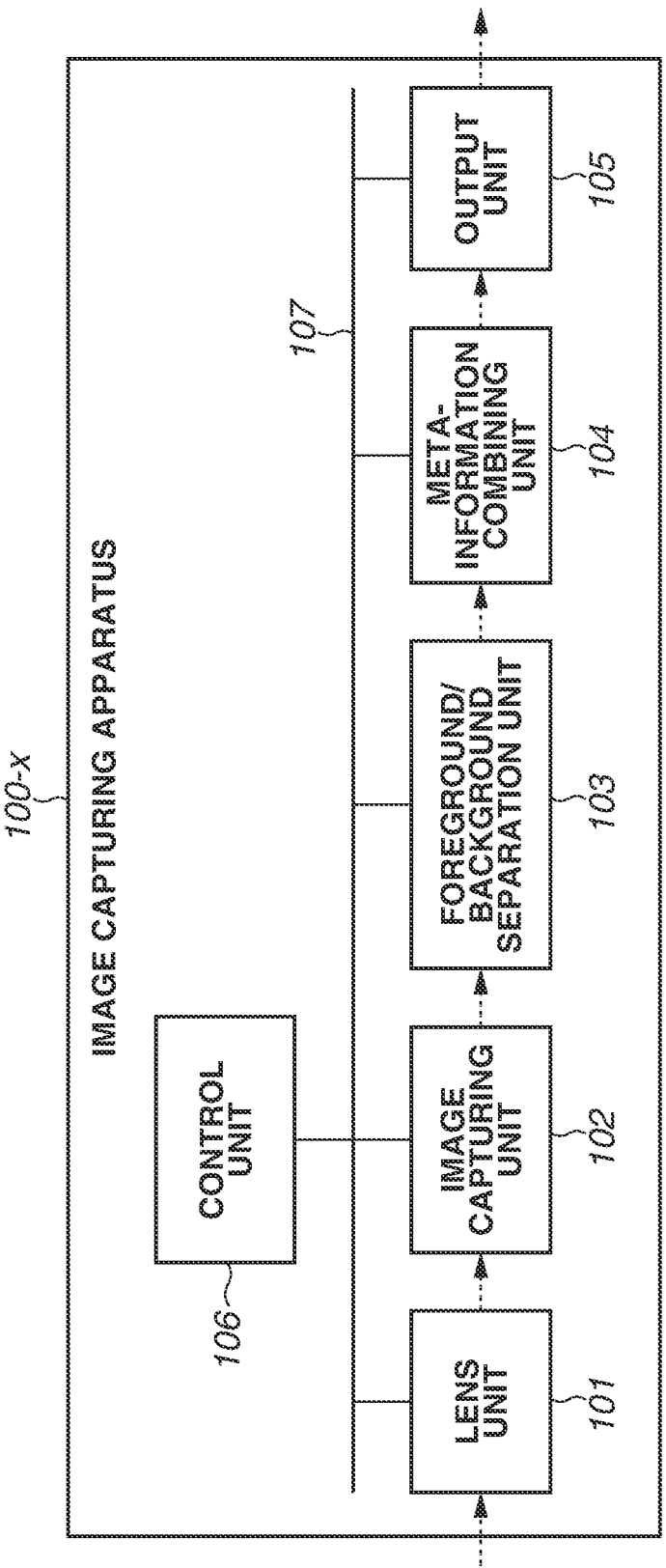
FIG. 4 is a block diagram illustrating a first example of a functional configuration of the image capturing apparatus.
Figure 5:
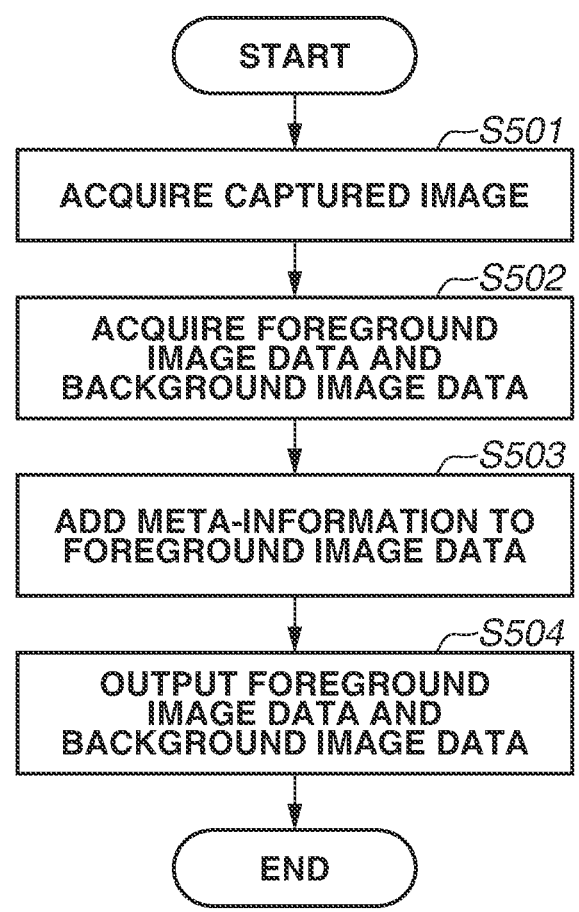
FIG. 5 is a flowchart illustrating a first example of an operation of the image capturing apparatus.

FIG. 4 is a block diagram illustrating an example of the functional configuration of the image capturing apparatus 100-x according to the present embodiment. FIG. 5 is a flowchart illustrating an example of the operation of the image capturing apparatus 100-x according to the present embodiment. The flowchart in FIG. 5 is executed, for example, every time the image capturing apparatus 100-x obtains a captured image. The image capturing apparatus 100-x includes a lens unit 101, an image capturing unit 102, a foreground/background separation unit 103, a meta-information combining unit 104, an output unit 105, and a control unit 106. These components are connected to each other by an internal bus 107 and can transmit and receive data to and from each other under control of the control unit 106. The lens unit 101 in FIG. 4 corresponds to, for example, the imaging optical system 301 and the imaging optical system control circuit 306 in FIG. 3. The image capturing unit 102 in FIG. 4 corresponds to, for example, the image sensor 302 and the A/D converter 303 in FIG. 3. Further, processing to be executed by the foreground/background separation unit 103 in FIG. 4 is executed by, for example, the image processing circuit 304 in FIG. 3. Further, the functions of the meta-information combining unit 104, the output unit 105, and the control unit 106 in FIG. 4 are achieved by, for example, the system controller 308 in FIG. 3. Further, processing in FIG. 5 is achieved by, for example, the system controller 308 in FIG. 3 reading various programs stored in the storage medium 307 and controlling the components. Examples of the configurations of the components are described in detail below.

The lens unit 101 is installed at a stage prior to the image capturing unit 102 and forms on the image capturing unit 102 an image of incident light from an image capturing target.

The image capturing unit 102 performs an exposure operation on the incident light of the image formed by the lens unit 101, thereby converting the incident light into an electric signal. Further, the image capturing unit 102 performs signal processing, such as correction of a defect in a sensor or optical variation in a lens, on the converted signal, thereby converting the signal into a raw image. The raw image is output to the foreground/background separation unit 103. In the present embodiment, in step S501, a captured image (a raw image) is acquired as described above.

The foreground/background separation unit 103 extracts an object such as a player from an image captured during a game in the playing field 210 among captured images (raw images) input from the image capturing unit 102, and outputs the object as "foreground image data" to the meta-information combining unit 104 at a stage subsequent to the foreground/background separation unit 103. Further, the foreground/background separation unit 103 outputs, as "background image data" to the meta-information combining unit 104, an image obtained by capturing in advance the scene of the playing field 210 in the state where no object is present, such as the scene of the playing field 210 before the start of the game. Hereinafter, to distinguish a captured image in which a foreground and a background are not separated from each other from "foreground image data"

and "background image data", this captured image will be referred to as "pre-foreground/background-separation image data".

Figure 6A:
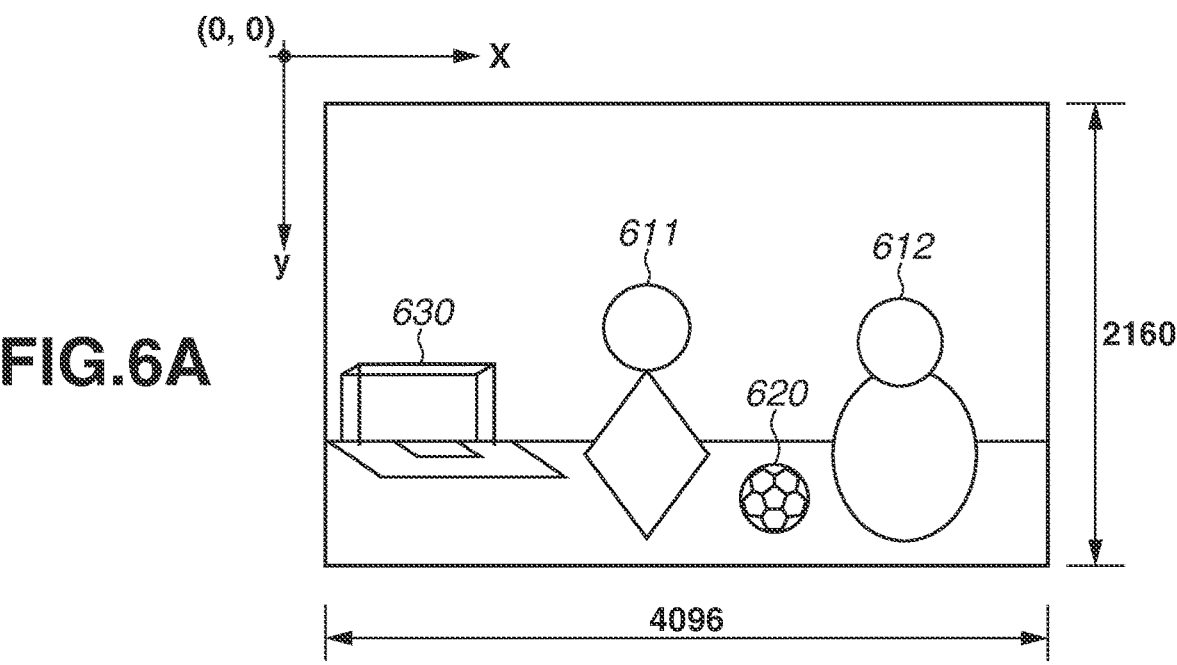
FIGS. 6A, 6B, and 6C are diagrams illustrating foreground image data and background image data.
Figure 6B:
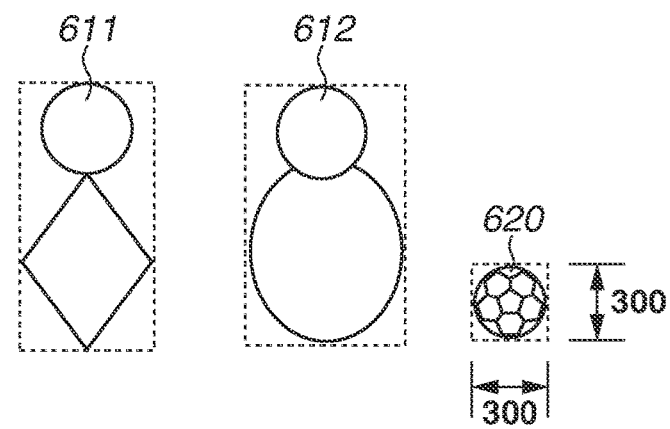
Figure 6C:
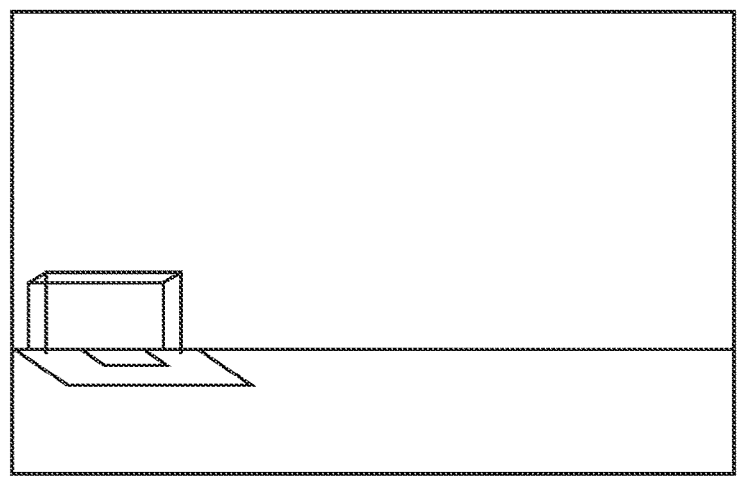

FIGS. 6A to 6C are diagrams respectively illustrating examples of the "pre-foreground/background-separation image data", the "foreground image data", and the "background image data". FIG. 6A is a diagram illustrating an example of the "pre-foreground/background-separation image data". In this case, the pre-foreground/background-separation image data is a captured image including two players 611 and 612, a soccer ball 620, and a soccer goal 630 in a soccer field as the playing field 210. FIG. 6B is a diagram illustrating an example of the "foreground image data". As an example, a case is illustrated where the two players 611 and 612 and the soccer ball 620 are extracted as pieces of "foreground image data". These pieces of "foreground image data" are treated as different pieces of "foreground image data". That is, in FIG. 6B, three pieces of foreground image data are generated. In the present embodiment, "foreground image data" is treated as rectangular data (see dashed lines in FIG. 6B). FIG. 6C is a diagram illustrating an example of the "background image data". An object that hardly changes over time during the game, such as the soccer goal 630, is treated as "background image data".

As the method for separating a foreground as an object, for example, a method using image processing including object extraction can be used. Object extraction is performed by extracting the difference between a captured image and a background image. The foreground may be not only a player playing a game but also, for example, another particular person (e.g., at least any one of a bench player, a manager, and a referee). Further, the foreground may be an object the image pattern of which is determined in advance, such as a ball or a goal. Further, as another method for detecting a foreground, for example, a moving object may be detected.

The foreground/background separation unit 103 outputs the "foreground image data" and the "background image data" as raw images to the meta-information combining unit 104. The foreground/background separation unit 103, however, does not necessarily need to output the "foreground image data" and the "background image data" to the meta-information combining unit 104 in this manner. For example, the foreground/background separation unit 103 may perform a development process on the "foreground image data" and the "background image data" and output the "foreground image data" and the "background image data" subjected to the development process to the meta-information combining unit 104.

In the present embodiment, in step S502, the "foreground image data" and the "background image data" are acquired as described above.

In step S503, the meta-information combining unit 104 adds, to the "foreground image data" output from the foreground/background separation unit 103, identification information (hereinafter referred to as "meta-information") for identifying an image of the "foreground image data". In the present embodiment, the meta-information includes at least the following information.

Coordinate information of the foreground image data
The size of the foreground image data
Identification information of the foreground image data
Identification information of the image capturing apparatus 100-x The "coordinate information of the foreground image data" indicates the display location of the "foreground image data" on the "pre-foreground/background-separation image data". In the example of FIG. 6A, when the top left corner of the "pre-foreground/background-separation image data" is the origin, the coordinates of the top left corner of the rectangle of each piece of "foreground image data" are added as the "coordinate information of the foreground image data". "The size of the foreground image data" is the size of the "foreground image data" relative to the "pre-foreground/background-separation image data". In the examples of FIGS. 6A and 6B, the size of the "foreground image data" is represented by the number of pixels. In a case where the "pre-foreground/background-separation image data" is an image of 4096×2160 pixels as illustrated in FIG. 6A, the size of the "foreground image data" of the soccer ball 620 illustrated in FIG. 6B is 300×300 pixels.

The "identification information of the foreground image data" is information for identifying the foreground image data itself. In the example of FIG. 6B, pieces of information for uniquely identifying the two players 611 and 612 and the soccer ball 620 are individually added to the players 611 and 612 and the soccer ball 620. The "identification information of the image capturing apparatus 100-x" is information for identifying the image capturing apparatus 100-x itself. As described above, information for uniquely identifying each image capturing apparatus 100-x such as "the image capturing apparatus 100-1", "the image capturing apparatus 100-2", or "the image capturing apparatus 100-n" is added as the identification information of the image capturing apparatus.

The meta-information combining unit 104 may further add "identification information of background image data corresponding to the foreground image data" to the "foreground image data" in addition to the above information. The "identification information of background image data corresponding to the foreground image data" is information for uniquely identifying the background image data illustrated in FIG. 6C. In a case where the "identification information of background image data corresponding to the foreground image data" is added to the "foreground image data", the meta-information combining unit 104 adds, also to the background image data, information for uniquely identifying the background image data itself.

In step S504, the output unit 105 outputs the "foreground image data" output from the meta-information combining unit 104, to the image generation apparatus 200 and the image monitoring apparatus 400 via the distribution apparatus 500 at a predetermined frame rate. Further, in step S504, the output unit 105 outputs the "background image data" to the image generation apparatus 200 via the distribution apparatus 500 at a predetermined frame rate. These frame rates may be different from each other.

Based on control information from a user interface (I/F) unit (not illustrated), the control unit 106 gives a control instruction to the components of the image capturing apparatus 100-x. For example, when the control unit 106 receives from the user I/F unit an adjustment parameter for adjusting the exposure, such as the iris or the International Organization for Standardization (ISO) sensitivity, the control unit 106 performs this exposure control on the image capturing unit 102.

Next, an example of the configuration of the image generation apparatus 200 will be described.

FIG. 7 is a block diagram illustrating an example of the hardware configuration of the image generation apparatus 200.

The image generation apparatus 200 includes a controller unit 700, an operation unit 709, and a display device 710.

The controller unit 700 includes a CPU 701. The CPU 701 starts an operating system (OS) by a boot program stored in a ROM 702. The CPU 701 executes on the OS an application program stored in a hard disk drive (HDD) 704, thereby achieving various processes. A RAM 703 is used as a work area for the CPU 701. The HDD 704 stores an application program.

The CPU 701 is connected to the ROM 702, the RAM 703, an operation unit I/F 705, a display unit I/F 706, and a communication I/F 707 via a system bus 708. The operation unit I/F 705 is an interface with the operation unit 709. The operation unit I/F 705 transmits, to the CPU 701, information input by the user through the operation unit 709. The operation unit 709 includes, for example, a mouse and a keyboard. The display unit I/F 706 outputs, to the display device 710, image data to be displayed on the display device 710. The display device 710 includes a computer display. The communication I/F 707 is connected to transmission cables. The communication I/F 707 exchanges information between external apparatuses (the user terminal 300, the image monitoring apparatus 400, and the distribution apparatus 500) via the transmission cables. Not all the components illustrated in FIG. 7 are essential components in the image generation apparatus 200. For example, the display device 710 is not an essential component. The image generation apparatus 200 can also display an image on an external display device 710 connected to the image generation apparatus 200 via a cable or a network.

FIG. 8 is a block diagram illustrating an example of the functional configuration of the image generation apparatus 200 according to the present embodiment. FIG. 9 is a flowchart illustrating an example of the operation of the image generation apparatus 200 according to the present embodiment. The image generation apparatus 200 includes an image input unit 201, an image saving unit 202, a virtual viewpoint image generation unit 203, an output unit 204, a control unit 205, and a user input unit 206. These components are connected to each other by an internal bus 207 and can transmit and receive data to and from each other under control of the control unit 205. The image input unit 201 in FIG. 8 corresponds to, for example, the communication I/F 707 in FIG. 7. The user input unit 206 in FIG. 8 corresponds to, for example, the operation unit I/F 705 in FIG. 7. The output unit 204 in FIG. 8 corresponds to, for example, the display unit I/F 706 and the communication I/F 707 in FIG. 7. Further, the image saving unit 202 in FIG. 8 corresponds to, for example, the ROM 702, the RAM 703, and the HDD 704 in FIG. 7. The control unit 205 corresponds to, for example, the CPU 701. Further, processing in FIG. 9 is achieved by, for example, the CPU 701 in FIG. 7 reading various programs stored in the ROM 702 and controlling the components. Examples of the components are described in detail below.

In step S901, "foreground image data" and "background image data" output from each image capturing apparatus 100-x are input to the image input unit 201 via the distribution apparatus 500 at different predetermined frame rates. Then, the image input unit 201 outputs the input "foreground image data" and "background image data" to the image saving unit 202. If "foreground image data" and "background image data" output from each image capturing apparatus 100-x are not input to the image input unit 201 (NO in step S901), step S902 is skipped, and the processing proceeds to step S903.

The image saving unit 202 is a database. In step S902, the image saving unit 202 saves the "foreground image data" and the "background image data" input from the image input unit 201. Further, the image saving unit 202 outputs, to the virtual viewpoint image generation unit 203, "foreground image data" and "background image data" specified by the virtual viewpoint image generation unit 203.

In step S903, the virtual viewpoint image generation unit 203 determines whether virtual viewpoint information is input from the control unit 205. An example of the method for generating virtual viewpoint information will be described below. As a result of this determination, if virtual viewpoint information is not input from the control unit 205 (NO in step S903), the processing returns to step S901. If, on the other hand, virtual viewpoint information is input from the control unit 205 (YES in step S903), then in step S904, the virtual viewpoint image generation unit 203 acquires "foreground image data" and "background image data" corresponding to the virtual viewpoint information from the image saving unit 202.

Then, in step S905, the virtual viewpoint image generation unit 203 combines, by image processing, the "foreground image data" and the "background image data" acquired from the image saving unit 202, thereby generating a virtual viewpoint image. Then, the virtual viewpoint image generation unit 203 outputs the virtual viewpoint image to the output unit 204. When generating the virtual viewpoint image, the virtual viewpoint image generation unit 203 may use the meta-information added to the "foreground image data" and the "background image data".

Examples of the method for generating the virtual viewpoint image include a method using model-based rendering (MBR). MBR is a method for generating a virtual viewpoint image using a three-dimensional model generated based on a plurality of captured images obtained by capturing an object from a plurality of directions. Specifically, MBR is a technique for, using a three-dimensional shape (model) of a target scene obtained by a three-dimensional shape reconstruction technique such as a volume intersection method or multi-view stereo (MVS), generating an image of the scene as seen from a virtual viewpoint. The method for generating the virtual viewpoint image is not limited to the method using MBR. Alternatively, a rendering technique other than MBR may be used.

In step S906, the output unit 204 converts the virtual viewpoint image input from the virtual viewpoint image generation unit 203 into a transmission signal that can be transmitted to the user terminal 300. Then, the output unit 204 outputs the transmission signal.

As described above, based on an operation of the user on the controller connected to the user terminal 300, the user terminal 300 receives an instruction to move a display position, change a display direction, or switch a viewpoint. Then, the user terminal 300 transmits a transmission signal indicating the content of the instruction to the image generation apparatus 200. The user input unit 206 converts the transmission signal thus input through the user terminal 300 into predetermined operation information. Then, the user input unit 206 outputs the operation information to the control unit 205.

Based on the operation information from the user input unit 206, the control unit 205 gives a control instruction to the components of the image generation apparatus 200. For example, when operation information of a virtual viewpoint is received from the user input unit 206, the control unit 205 converts the operation information into virtual viewpoint information and transmits the virtual viewpoint information as control information to the virtual viewpoint image generation unit 203. As described above, when the virtual viewpoint information is input to the virtual viewpoint image generation unit 203, the virtual viewpoint image generation unit 203 generates and outputs a virtual viewpoint image.

The user terminal 300 displays, on the display screen included in the user terminal 300, the virtual viewpoint image received from the image generation apparatus 200. In this manner, the user views a content from a viewpoint based on the operation of the user. As described above, the user terminal 300 is, for example, a PC or a tablet. The controller includes, for example, a mouse, a keyboard, a six-axis controller, or a touch panel. The user operates the controllers, thereby causing a still image or a moving image to be displayed on the display screen included in the user terminal 300. The hardware of the user terminal 300 can be achieved by, for example, the configuration illustrated in FIG. 7, and therefore is not described in detail here.

Figure 10:
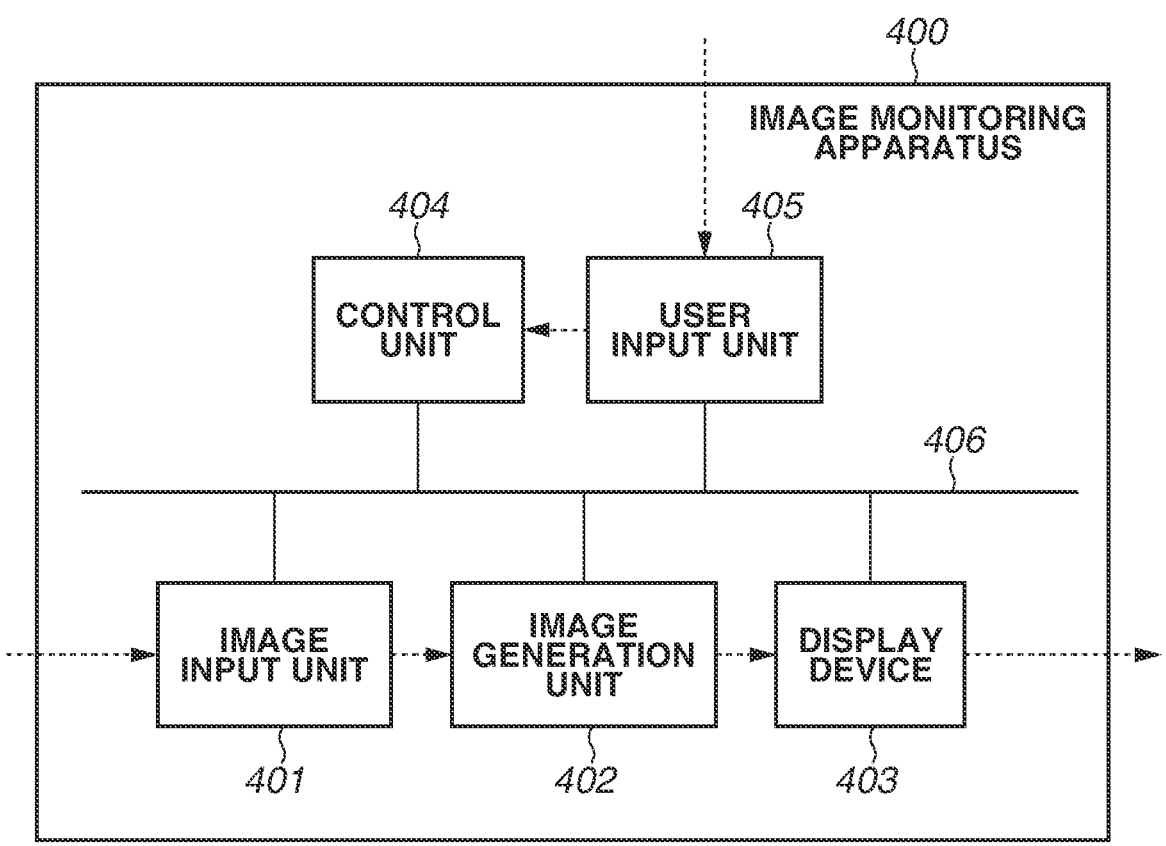
FIG. 10 is a block diagram illustrating a first example of a functional configuration of an image monitoring apparatus.
Figure 11:
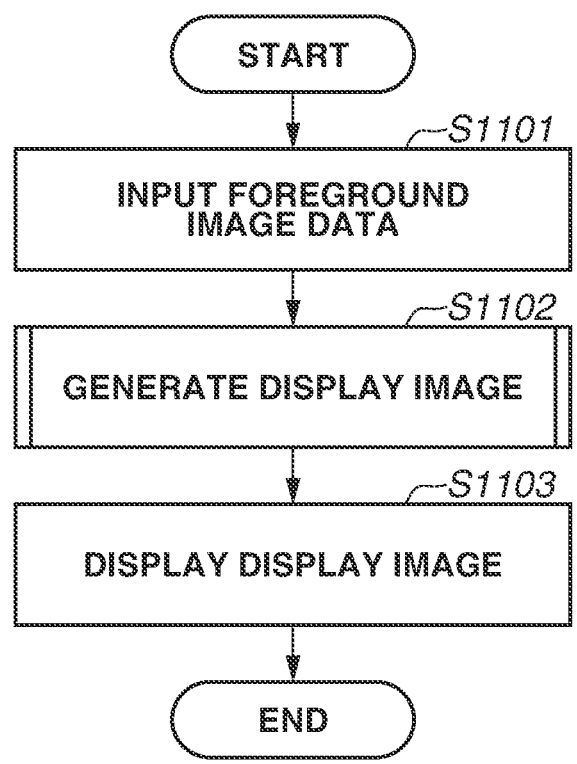
FIG. 11 is a flowchart illustrating a first example of an operation of the image monitoring apparatus.

Next, an example of the configuration of the image monitoring apparatus 400 will be described. FIG. 10 is a block diagram illustrating an example of the functional configuration of the image monitoring apparatus 400 according to the present embodiment. FIG. 11 is a flowchart illustrating an example of the operation of the image monitoring apparatus 400 according to the present embodiment. The hardware of the image monitoring apparatus 400 can be achieved by, for example, the configuration illustrated in FIG. 7, and therefore is not described in detail here. The image monitoring apparatus 400 is an example of an information processing apparatus for performing processing including the classification of an image of a foreground based on meta-information. The image monitoring apparatus 400 includes an image input unit 401, an image generation unit 402, a display unit 403, a control unit 404, and a user input unit 405. These components are connected to each other by an internal bus 406 and can transmit and receive data to and from each other under control of the control unit 404. The image input unit 401 in FIG. 10 corresponds to, for example, the communication I/F 707 in FIG. 7. The user input unit 405 in FIG. 10 corresponds to, for example, the operation unit I/F 705 in FIG. 7. The display unit 403 in FIG. 10 corresponds to, for example, the display unit I/F 706 in FIG. 7. Further, the image generation unit 402 and the control unit 404 in FIG. 10 correspond to, for example, the CPU 701. Further, processing in FIG. 11 is achieved by, for example, the CPU 701 in FIG. 7 reading various programs stored in the ROM 702 and controlling the components. Examples of the configurations of the components are described in detail below.

In step S1101, "foreground image data" output from each image capturing apparatus 100-x is input to the image input unit 401 via the distribution apparatus 500 at a predetermined frame rate. Then, the image input unit 401 outputs the input "foreground image data" to the image generation unit 402.

In step S1102, based on all the pieces of "foreground image data" of the image capturing apparatuses 100-x output from the image input unit 401 and the pieces of meta-information added to all the pieces of "foreground image data", the image generation unit 402 generates, at a frame rate equivalent to that of the image input unit 401, a display image to be displayed on the display unit 403. The display image is generated according to an instruction from the control unit 404 to specify a display image type. An example of the flow for generating the display image will be described below.

The display unit 403 includes a frame buffer and a display panel. In step S1103, the display unit 403 stores the display image output from the image generation unit 402 in the frame buffer (overwrites the frame buffer with the display image). Then, the display unit 403 reads the display image stored in the frame buffer at a predetermined refresh rate and displays the display image on the display panel. The display panel is, for example, a liquid crystal panel or an organic electroluminescent (EL) panel.

Based on operation information from the user input unit 405, the control unit 404 gives a control instruction to the components of the image monitoring apparatus 400. For example, when the control unit 404 receives, from the user input unit 405, operation information indicating an instruction to switch the display image type, the control unit 404 converts the operation information into the corresponding display image type and transmits the display image type to the image generation unit 402.

In the present embodiment, the following display image type is included.

An image-capturing-apparatus-based foreground display image

An example of the specific content of the display image will be described below. Furthermore, the control unit 404 may output a signal to change settings of one or more image capturing apparatus 100-x in accordance with operation information from the user input unit 405. In other words, the operator can change camera settings based on the display in the image monitoring apparatus 400 which displays the foreground objects.

The user input unit 405 receives operation information input from a controller (not illustrated) and outputs the operation information to the control unit 404. The controller includes at least any one of, for example, a mouse, a keyboard, a six-axis controller, and a touch panel.

Figure 12:
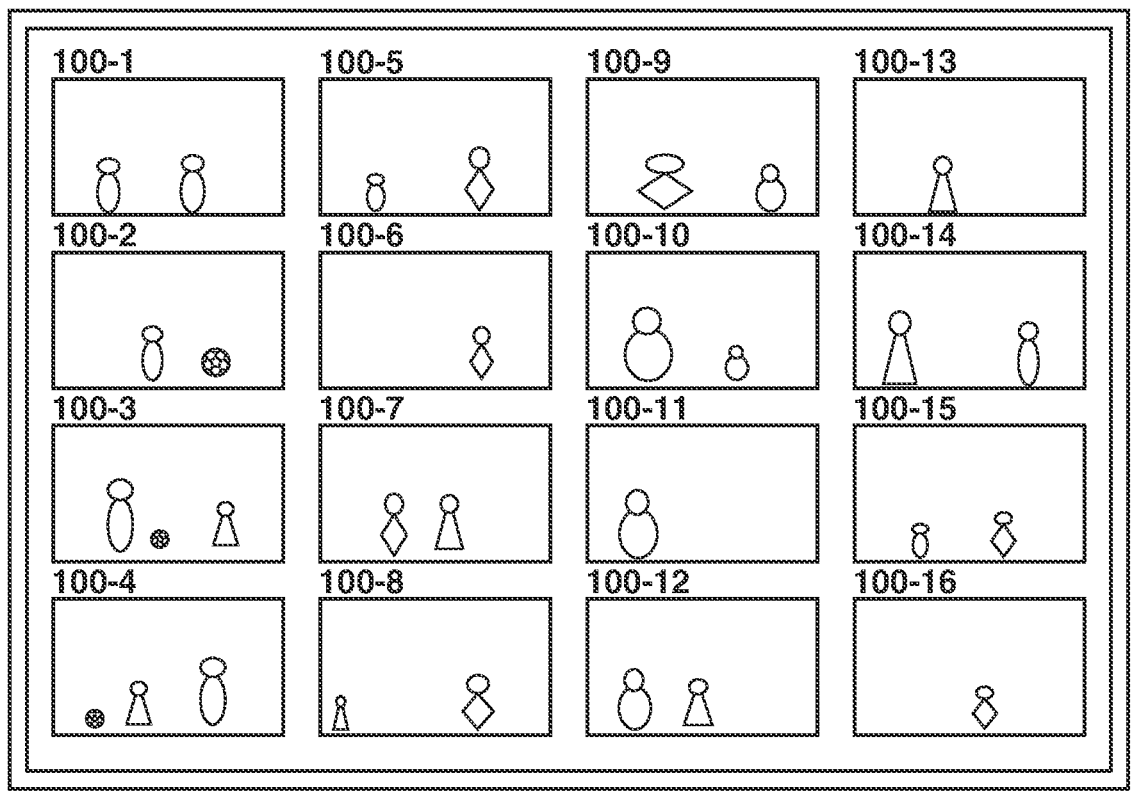
FIG. 12 is a diagram illustrating a first example of a display image displayed on the image monitoring apparatus.

FIG. 12 is a diagram illustrating an example of the display image to be displayed on the image monitoring apparatus 400 according to the present embodiment. FIG. 12 illustrates an example of the "image-capturing-apparatus-based foreground display image" (the display image type). The display unit 403 displays a list of only foregrounds captured at the same timing by the image capturing apparatuses 100-x and updates the display image in the same cycle as that of a synchronization signal from the synchronization apparatus (not illustrated). That is, the display unit 403 displays as a moving image a list of captured images (pieces of "foreground image data") obtained by subtracting "background image data" from "pre-foreground/background-separation image data" with respect to each image capturing apparatus 100-x. FIG. 12 illustrates as an example a case where a list of pieces of "foreground image data" obtained from images captured by 16 image capturing apparatuses 100-x, namely the image capturing apparatuses 100-1 to 100-16, is displayed.

Figure 13:
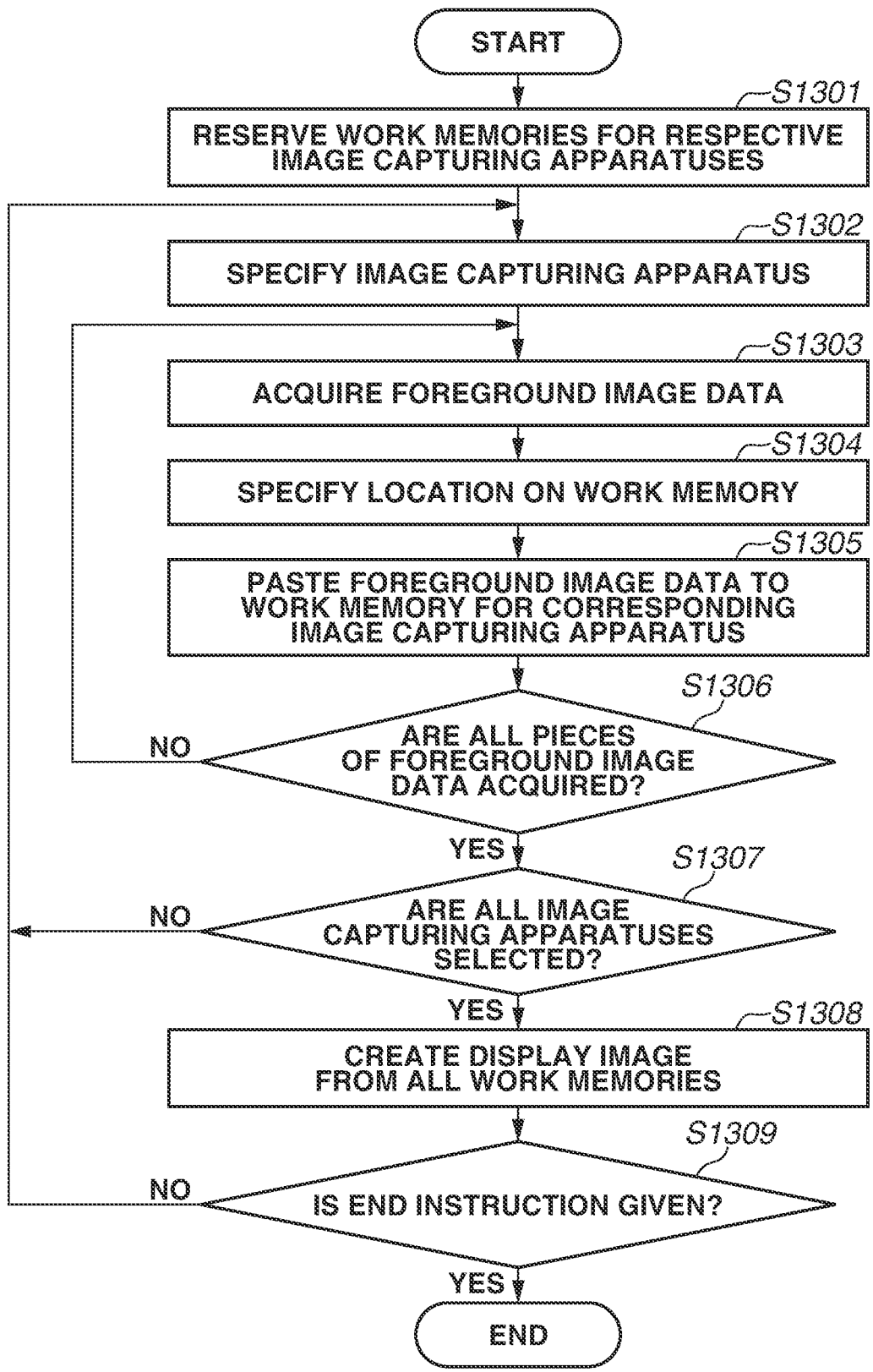
FIG. 13 is a flowchart illustrating a first example of a process of generating the display image.

Next, an example of the processing of the image monitoring apparatus 400 when generating the display image will be described taking as an example a case where the display image type is the "image-capturing-apparatus-based foreground display image". FIG. 13 is a flowchart illustrating an example of the processing of the image monitoring apparatus 400 when generating the display image.

In step S1301, the image generation unit 402 reserves at least as many work memories as the number of the image capturing apparatuses 100-x. For example, in a case where there are a total of 16 image capturing apparatuses 100-x, the image generation unit 402 reserves at least 16 work memories. These work memories are frame buffers for reproducing captured images of the respective image capturing apparatuses 100-x. Further, each work memory has a size capable of reproducing resolution and color depth equivalent to those of the captured image of each image capturing apparatus 100-*x*.

Then, in step S1302, the image generation unit 402 receives "foreground image data" of one of the image capturing apparatuses 100-*x* from the image input unit 401. Then, based on the meta-information (the "identification information of the image capturing apparatus 100-*x*") added to the received "foreground image data", the image generation unit 402 specifies by which of the image capturing apparatuses 100-*x* the received "foreground image data" is captured. For example, suppose that the image capturing apparatus 100-*x* specified by the image generation unit 402 is the image capturing apparatus 100-1. In this case, the processes of step S1303 and thereafter are performed on the work memory for the image capturing apparatus 100-1.

Next, in step S1303, the image generation unit 402 acquires a piece of "foreground image data" that has not yet been selected in the "foreground image data" of the specified image capturing apparatus 100-*x*.

Next, in step S1304, based on the meta-information (the "coordinate information of the foreground image data" and "the size of the foreground image data") of the acquired "foreground image data", the image generation unit 402 specifies to which location on the work memory the acquired "foreground image data" should be pasted.

The "foreground image data" according to the present embodiment is a raw image. Thus, in step S1305, the image generation unit 402 performs a development process on the "foreground image data". Then, the image generation unit 402 pastes the "foreground image data" subjected to the development process to the location specified in step S1304 on the work memory for the image capturing apparatus 100-*x*.

The processes of steps S1303 to S1305 are also repeatedly performed on the remaining pieces of "foreground image data" of the image capturing apparatus 100-*x* specified in step S1302. Thus, in step S1306, the image generation unit 402 determines whether all the pieces of "foreground image data" of the image capturing apparatus 100-*x* specified in step S1302 are pasted to the work memory. As a result of this determination, if not all the pieces of "foreground image data" of the image capturing apparatus 100-*x* specified in step S1302 are pasted to the work memory (NO in step S1306), the processing returns to step S1303. Then, the processes of steps S1303 to S1306 are repeatedly executed until all the pieces of "foreground image data" of the image capturing apparatus 100-*x* specified in step S1302 are pasted to the work memory. If all the pieces of "foreground image data" of the image capturing apparatus 100-*x* specified in step S1302 are pasted to the work memory (YES in step S1306), the processing proceeds to step S1307.

Then, in step S1307, the image generation unit 402 determines whether all the pieces of "foreground image data" of all the image capturing apparatuses 100-*x* set in advance for the image monitoring apparatus 400 are pasted to the work memories. As a result of this determination, if not all the pieces of "foreground image data" of all the image capturing apparatuses 100-*x* set in advance for the image monitoring apparatus 400 are pasted to the work memories (NO in step S1307), the processing returns to step S1302. Then, the processes of steps S1302 to S1307 are repeatedly executed until all the pieces of "foreground image data" of all the image capturing apparatuses 100-*x* set in advance for the image monitoring apparatus 400 are pasted to the work memories. If all the pieces of "foreground image data" of all the image capturing apparatuses 100-*x* set in advance for the image monitoring apparatus 400 are pasted to the work memories (YES in step S1307), the processing proceeds to step S1308.

Then, in step S1308, the image generation unit 402 transfers captured images (pieces of "foreground image data") reproduced in all the work memories to the frame buffer of the display unit 403, thereby creating a display image. At this time, according to the size of the frame buffer of the display unit 403, the image generation unit 402 performs a reduction process on the captured images (the pieces of "foreground image data"). As described above, FIG. 12 illustrates an example of the display image created in the frame buffer.

The processes of steps S1302 to S1308 are finished at least within the period of the frame rate of the "foreground image data" input from the image input unit 401. Then, in step S1309, the image generation unit 402 determines whether an end instruction is given by the control unit 404. As a result of this determination, if an end instruction is given by the control unit 404 (YES in step S1309), the processing of the flowchart in FIG. 13 ends. If, on the other hand, an end instruction is not given by the control unit 404 (NO in step S1309), when the period of the frame rate of the "foreground image data" ends, the processing returns to step S1302. Then, the processes of steps S1302 to S1309 are repeated.

As described above, in the present embodiment, the image monitoring apparatus 400 extracts pieces of "foreground image data" from captured images captured by the plurality of image capturing apparatuses 100-*x*, classifies the pieces of "foreground image data" with respect to each image capturing apparatus 100-*x*, and displays a display image representing only the pieces of "foreground image data" with respect to each image capturing apparatus 100-*x*. Thus, in the image monitoring system including the plurality of image capturing apparatuses 100-*x*, captured images of the individual image capturing apparatuses 100-*x* can be displayed by limiting the captured images to pieces of "foreground image data" such as a player and a ball to which the user pays attention. Thus, it is possible to monitor the presence or absence of an obstacle, or the occurrence of overexposure or underexposure efficiently with low load. Thus, it is possible to reduce the burden of monitoring individual images captured by the plurality of image capturing apparatuses 100-*x* while achieving sufficiently thorough monitoring.

Further, in the present embodiment, the foreground/background separation unit 103 separates "foreground image data" and "background image data". This separation, however, is not always properly performed, and the following problem may occur. A part of the "foreground image data" may be missing, or an object that should be the "background image data" may be determined as the "foreground image data". In the present embodiment, it is also possible to efficiently detect such a problem.

Further, the present embodiment takes a form in which the image capturing apparatuses 100-*x* are connected to each other in a row. Such a form has the advantage that the work of laying transmission cables and the cost can be reduced in the playing field 210 such as a soccer field, while there is a limitation on the transmission band of captured images. Even in such a case, in the present embodiment, only "foreground image data" is transmitted and monitored in a limited manner, whereby it is possible to reduce the load of the transmission band.

The present embodiment is also applicable to a system that does not generate a virtual viewpoint image. As described above, however, the image quality of a virtual viewpoint image generated by the image generation apparatus 200 depends largely on the image quality of "foreground image data". Thus, the present embodiment is a form particularly suitable for a system for generating a virtual viewpoint image.

Next, a second embodiment will be described. The first embodiment has been described taking as an example a case where each image capturing apparatus 100-x unconditionally transmits "foreground image data" separated from "pre-foreground/background-separation image data" to the image generation apparatus 200 and the image monitoring apparatus 400. In contrast, in the present embodiment, "foreground image data" to be transmitted from each image capturing apparatus 100-x is limited in a predetermined size range, thereby obtaining effects comparable to those of the first embodiment while further reducing the load of the transmission band. The present embodiment and the first embodiment are thus different mainly in processing performed when each image capturing apparatus 100-x transmits "foreground image data". Thus, in the description of the present embodiment, portions similar to those of the first embodiment are designated by the same numerals as those in FIGS. 1 to 13, and are not described in detail.

The configuration of an image monitoring system according to the present embodiment is similar to that according to the first embodiment. Further, the configurations of an image generation apparatus 200, a user terminal 300, an image monitoring apparatus 400, and a distribution apparatus 500 are also similar to those according to the first embodiment.

Figure 14:
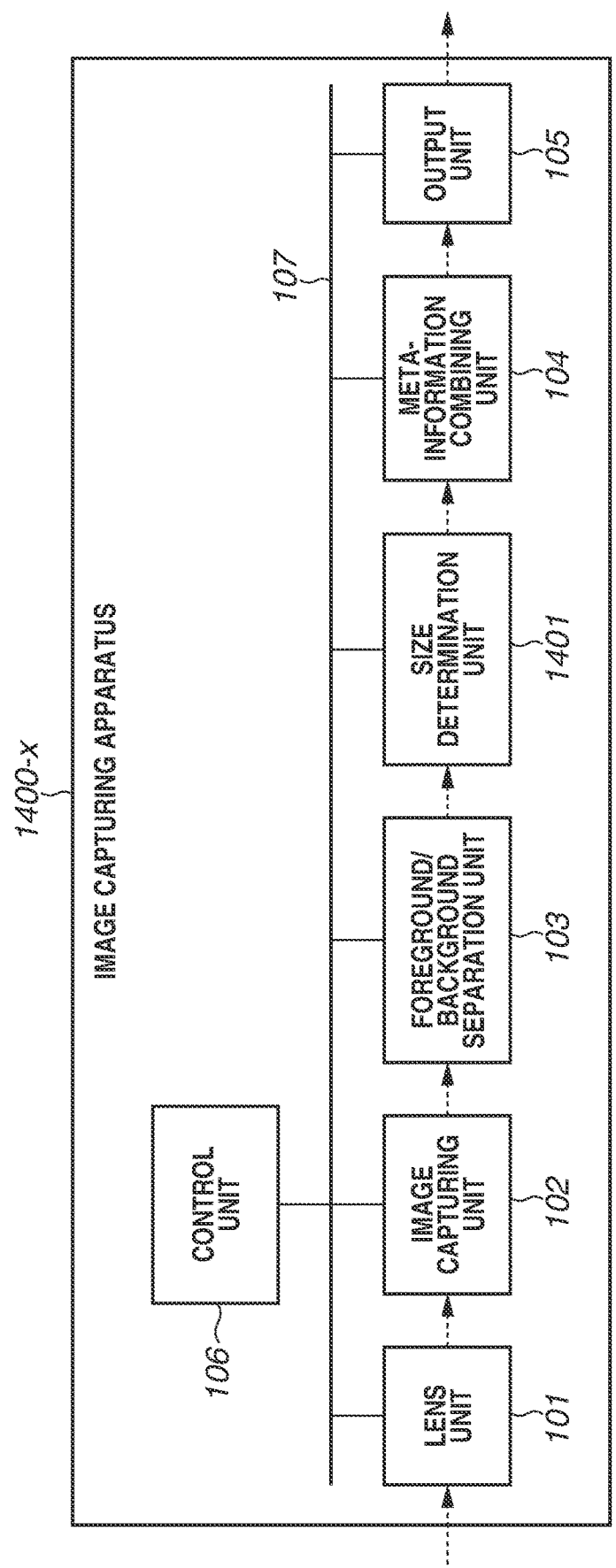
FIG. 14 is a block diagram illustrating a second example of the functional configuration of the image capturing apparatus.

FIG. 14 is a block diagram illustrating an example of the functional configuration of an image capturing apparatus 1400-x according to the present embodiment, which is contrasted with the image capturing apparatus 100-x according to the first embodiment illustrated in FIG. 4. The hardware of the image capturing apparatus 1400-x according to the present embodiment is similar to the hardware of the image capturing apparatus 100-x according to the first embodiment.

The image capturing apparatus 1400-x includes a lens unit 101, an image capturing unit 102, a foreground/background separation unit 103, a meta-information combining unit 104, an output unit 105, a control unit 106, and a size determination unit 1401. These components are connected to each other by an internal bus 107 and can transmit and receive data to and from each other under control of the control unit 106. The function of the size determination unit 1401 is achieved by, for example, the image processing circuit 304.

In the image capturing apparatus 1400-x, portions other than the size determination unit 1401 are similar to those of the image capturing apparatus 100-x. The present embodiment, however, is different from the first embodiment in that the foreground/background separation unit 103 outputs "foreground image data" separated from "pre-foreground/background-separation image data" not to the meta-information combining unit 104 but to the size determination unit 1401. Further, the present embodiment is different from the first embodiment in that "foreground image data" is input to the meta-information combining unit 104 not from the foreground/background separation unit 103 but from the size determination unit 1401.

The size determination unit 1401 determines the size of "foreground image data" output from the foreground/background separation unit 103 and outputs only "foreground image data" in a predetermined size range to the meta-information combining unit 104.

Figure 15:
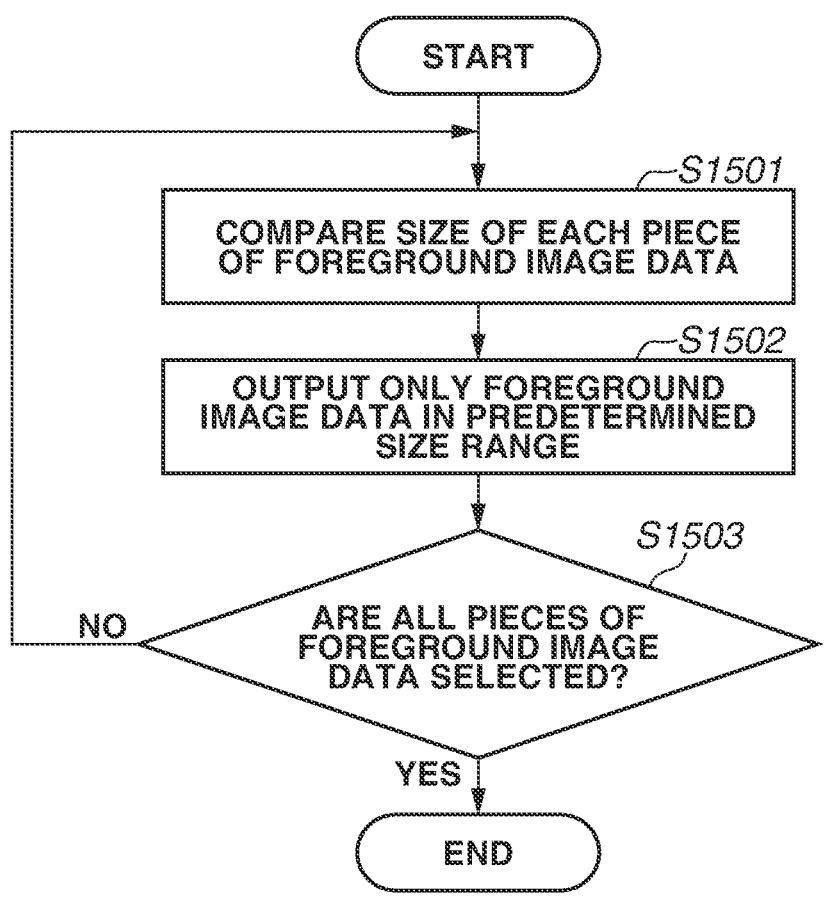
FIG. 15 is a flowchart illustrating an example of processing of a size determination unit.

FIG. 15 is a flowchart illustrating an example of the processing of the size determination unit 1401 of the image capturing apparatus 1400-x. The flowchart in FIG. 15 is performed, for example, between steps S502 and S503 in FIG. 5.

In step S1501, the size determination unit 1401 determines whether each piece of "foreground image data" output from the foreground/background separation unit 103 is in a predetermined size range. The predetermined size may be a fixed value or a variable value to be dynamically changed through the control unit 106. For example, in a case where the image generation apparatus 200 generates a virtual viewpoint image using MBR, the size determination unit 1401 can calculate the predetermined size based on size requirements necessary to create a three-dimensional shape. Further, the size determination unit 1401 may determine, for example, the degree of focus of the "foreground image data" in addition to the determination of the size of the "foreground image data".

Then, in step S1502, the size determination unit 1401 outputs only "foreground image data" in the predetermined size range to the meta-information combining unit 104. At this time, even if "foreground image data" is in the predetermined size range, if the degree of focus of the "foreground image data" is lower than a predetermined value, the size determination unit 1401 may not output the "foreground image data" to the meta-information combining unit 104. In this manner, in a case where an obstacle is present in front of the image capturing apparatus 1400-x, it is possible to reduce the risk of transmitting the obstacle as a foreground.

The size determination unit 1401 determines whether the processes of steps S1501 and S1502 are performed on all the pieces of "foreground image data" output from the foreground/background separation unit 103. As a result of this determination, if the processes of steps S1501 and S1502 are not performed on all the pieces of "foreground image data" (NO in step S1503), the processing returns to step S1501. Then, the processes of steps S1501 and S1502 are repeatedly performed until the processes of steps S1501 and S1502 are performed on all the pieces of "foreground image data". Then, if the processes of steps S1501 and S1502 are performed on all the pieces of "foreground image data" (YES in step S1503), the processing of the flowchart in FIG. 15 ends.

As described above, in the present embodiment, the size determination unit 1401 outputs, among pieces of "foreground image data" output from the foreground/background separation unit 103, only a piece of "foreground image data" satisfying a predetermined condition regarding a size to the meta-information combining unit 104. Thus, in addition to the effects described in the first embodiment, it is possible to monitor an image having high priority for a virtual viewpoint image to be generated by the image generation apparatus 200. Thus, it is possible to obtain the effects described in the first embodiment while further reducing the load of the transmission band.

The present embodiment has been described taking as an example a case where the size of "foreground image data" is determined by the image capturing apparatus 1400-x. However, in a case where the transmission band is sufficiently large, the size of "foreground image data" may be determined by the image monitoring apparatus 400.

Also in the present embodiment, the variations described in the first embodiment can be employed.

Next, a third embodiment will be described. The first embodiment has been described taking as an example a case where each image capturing apparatus 100-x unconditionally transmits "foreground image data" separated from "pre-foreground/background-separation image data" to the image generation apparatus 200 and the image monitoring apparatus 400. In contrast, in the present embodiment, each image capturing apparatus 100-x transmits "foreground image data" to the image generation apparatus 200 and the image monitoring apparatus 400 only when capturing a gaze point area, thereby obtaining effects comparable to those of the first embodiment while further reducing the load of the transmission band. The present embodiment and the first embodiment are thus different mainly in processing performed when each image capturing apparatus transmits "foreground image data". Thus, in the description of the present embodiment, portions similar to those of the first embodiment are designated by the same numerals as those in FIGS. 1 to 13, and are not described in detail.

The configuration of an image monitoring system according to the present embodiment is similar to that according to the first embodiment. Further, the configurations of an image generation apparatus 200, a user terminal 300, an image monitoring apparatus 400, and a distribution apparatus 500 are also similar to those according to the first embodiment.

Figure 16:
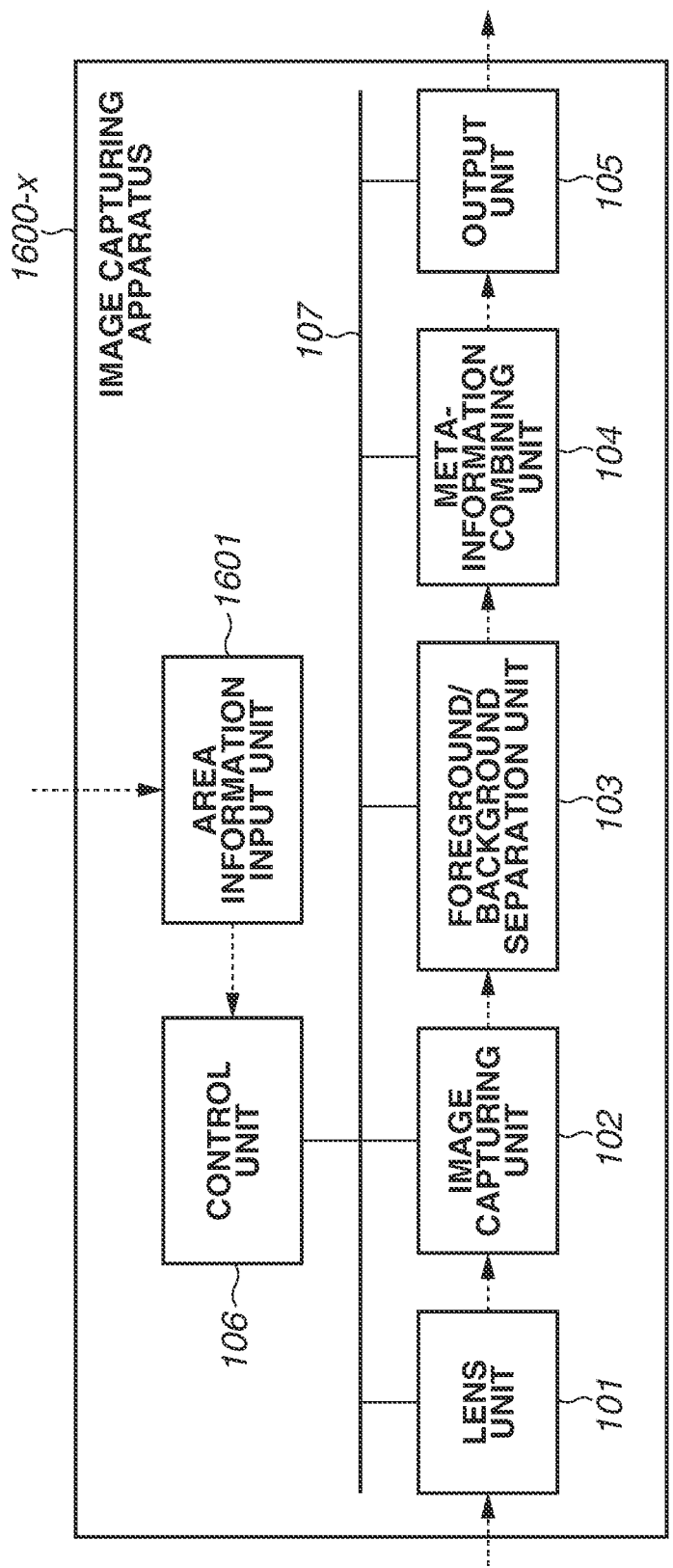
FIG. 16 is a block diagram illustrating a third example of the functional configuration of the image capturing apparatus.

FIG. 16 is a block diagram illustrating an example of the functional configuration of an image capturing apparatus 1600-x according to the present embodiment, which is contrasted with the image capturing apparatus 100-x according to the first embodiment illustrated in FIG. 4. The hardware of the image capturing apparatus 1600-x according to the present embodiment is similar to the hardware of the image capturing apparatus 100-x according to the first embodiment.

The image capturing apparatus 1600-x includes a lens unit 101, an image capturing unit 102, a foreground/background separation unit 103, a meta-information combining unit 104, an output unit 105, a control unit 106, and an area information input unit 1601. These components are connected to each other by an internal bus 107 and can transmit and receive data to and from each other under control of the control unit 106. The function of the area information input unit 1601 is achieved by, for example, the system controller 308. That is, the system controller 308 communicates with an external apparatus, thereby acquiring area information.

In the image capturing apparatus 1600-x, portions other than the area information input unit 1601 are similar to those of the image capturing apparatus 100-x. The area information input unit 1601 outputs externally input gaze point area information to the control unit 106.

Figure 17:
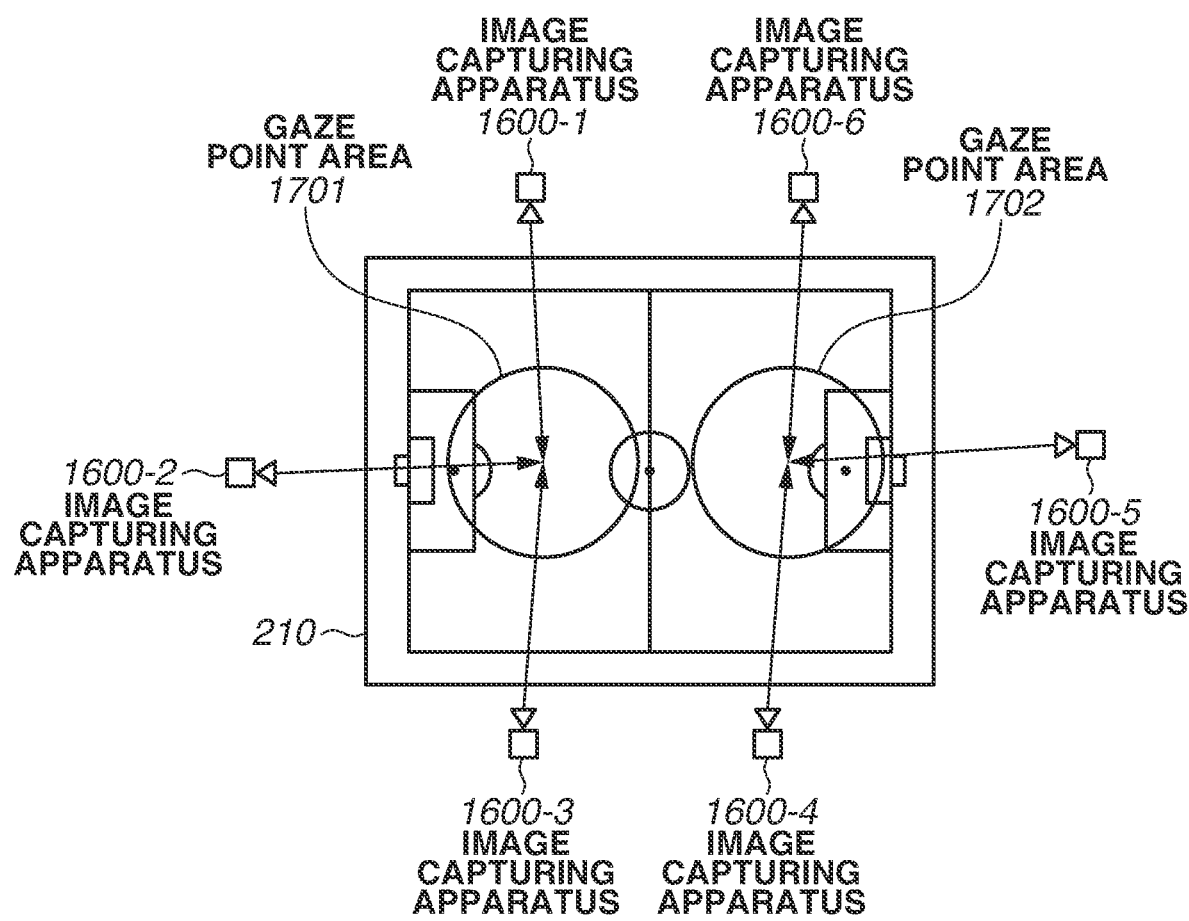
FIG. 17 is a diagram illustrating a gaze point area.

FIG. 17 is an image diagram illustrating an example of a gaze point area. In FIG. 17, gaze point areas 1701 and 1702 are indicated by circles in the playing field 210 (a soccer field). The gaze point areas 1701 and 1702 are examples of a region set in advance. The image capturing apparatus 1600-x captures an image by focusing on the center of any one of at least one or more gaze point areas 1701 and 1702 as the center of the captured image.

FIG. 17 illustrates as an example a case where two gaze point areas 1701 and 1702 are present. Image capturing apparatuses 1600-1, 1600-2, and 1600-3 align the centers of captured images to the center of the gaze point area 1701. Meanwhile, image capturing apparatuses 1600-4, 1600-5, and 1600-6 align the centers of captured images to the center of the gaze point area 1702. The gaze point area information refers to identification information for uniquely identifying each of the gaze point areas 1701 and 1702.

Figure 18:
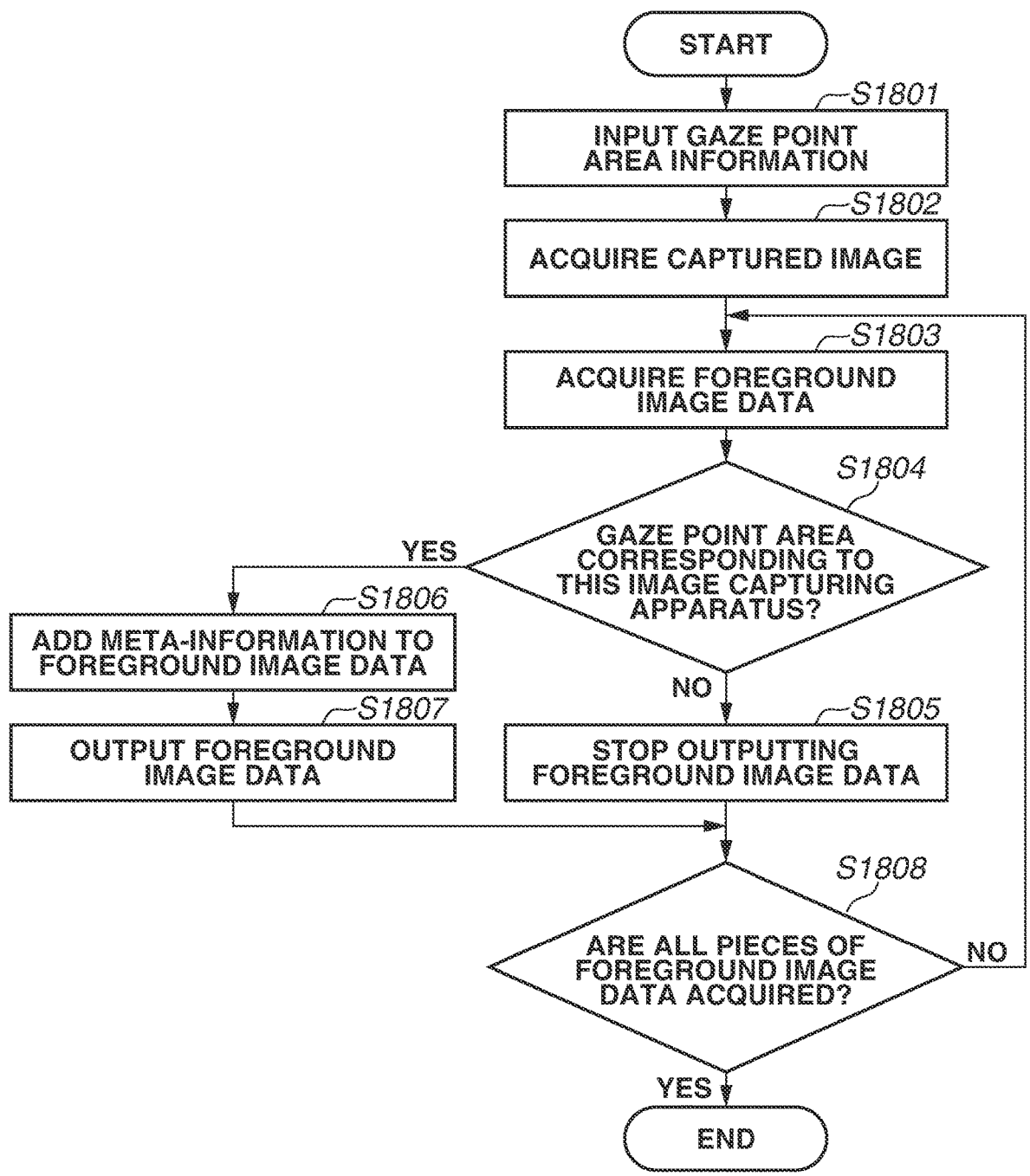
FIG. 18 is a flowchart illustrating a second example of the operation of the image capturing apparatus.

FIG. 18 is a flowchart illustrating an example of the operation of the image capturing apparatus 1600-x according to the present embodiment. The flowchart in FIG. 18 is executed, for example, every time the image capturing apparatus 1600-x obtains a captured image.

First, in step S1801, gaze point area information is input to the control unit 106 from an external apparatus via the area information input unit 1601. At this time, the external apparatus is, for example, the image monitoring apparatus 400. In this case, for example, based on an operation of the person in charge of monitoring using the controller accompanying the image monitoring apparatus 400, gaze point area information is input to the image monitoring apparatus 400. Then, the image monitoring apparatus 400 transmits the gaze point area information to the image capturing apparatuses 1600-x via transmission cables.

Next, in step S1802, similarly to the first embodiment, the image capturing unit 102 acquires "pre-foreground/background-separation image data". Next, in step S1803, the foreground/background separation unit 103 acquires a piece of "foreground image data" from the "pre-foreground/background-separation image data". At this time, similarly to the first embodiment, the foreground/background separation unit 103 may acquire "background image data".

In the control unit 106, information indicating which gaze point area is to be captured by the image capturing apparatus 1600-x that includes the control unit 106 is set in advance. In step S1804, based on this information, the control unit 106 determines whether the gaze point area information input in step S1801 is information of the gaze point area corresponding to the image capturing apparatus 1600-x. As a result of this determination, if the gaze point area information input in step S1801 is not information of the gaze point area corresponding to the image capturing apparatus 1600-x (NO in step S1804), then in step S1805, the control unit 106 stops outputting the "foreground image data" to the image monitoring apparatus 400.

If, on the other hand, the gaze point area information input in step S1801 is information of the gaze point area corresponding to the image capturing apparatus 1600-x (YES in step S1804), then in step S1806, the meta-information combining unit 104 adds meta-information to the "foreground image data" acquired by the foreground/background separation unit 103.

Next, in step S1807, the control unit 106 instructs the output unit 105 to output the "foreground image data". Based on this instruction, the output unit 105 outputs the "foreground image data" output from the meta-information combining unit 104, to the image generation apparatus 200 and the image monitoring apparatus 400 at a predetermined frame rate.

After it is determined whether the "foreground image data" is to be output as described above, then in step S1808, the control unit 106 determines whether all the pieces of "foreground image data" are acquired from the "pre-foreground/background-separation image data" acquired in step S1801. As a result of this determination, if not all the pieces of "foreground image data" are acquired from the "pre-foreground/background-separation image data" (NO in step S1808), the processing returns to step S1803. Then, the processes of steps S1803 to S1808 are repeatedly executed until all the pieces of "foreground image data" are acquired from the "pre-foreground/background-separation image data". Then, if all the pieces of "foreground image data" are acquired from the "pre-foreground/background-separation image data" (YES in step S1808), the processing of the flowchart in FIG. 18 ends.

As described above, in the present embodiment, each image capturing apparatus 1600-x transmits "foreground image data" to the image generation apparatus 200 and the image monitoring apparatus 400 only when capturing either of the gaze point areas 1701 and 1702. Thus, the person in charge of monitoring can monitor a gaze point area to which the user is assumed to pay more attention. Thus, it is possible to obtain the effects described in the first embodiment while further reducing the load of the transmission band. For example, if a ball is present in the gaze point area 1701 in the playing field 210 (a soccer field), most users view a virtual viewpoint image of the gaze point area 1701. Thus, "foreground image data" obtained from the image capturing apparatus 1600-*x* capturing the gaze point area 1701 where the image quality of "foreground image data" is more important is preferentially monitored, whereby it is possible to both reduce the load of monitoring captured images and reduce the load of the transmission band.

The present embodiment has been described taking as an example a case where a gaze point area to which the user pays attention is specified by the person in charge of monitoring, using the controller accompanying the image monitoring apparatus 400. However, the method for specifying the gaze point area is not limited to such a method. Alternatively, for example, the image monitoring apparatus 400 may count the number of foregrounds with respect to each of the gaze point areas 1701 and 1702 and directly transmit information of the gaze point area having a larger number of foregrounds as the result of the counting, as gaze point area information to the image capturing apparatus 1600-*x*. Yet alternatively, a unit for recognizing a particular object such as a ball may be provided in the image monitoring apparatus 400, and the image monitoring apparatus 400 may extract a gaze point area including the particular object and directly transmit information of the extracted gaze point area as gaze point area information to the image capturing apparatus 1600-*x*. In step S1801, the image capturing apparatus 1600-*x* sets the thus transmitted gaze point area information and then performs the subsequent processes in FIG. 18.

Further, the second embodiment and the present embodiment may be combined together. That is, in a case where each image capturing apparatus 1600-*x* captures either of the gaze point areas 1701 and 1702, and "foreground image data" satisfies the predetermined condition regarding a size, the image capturing apparatus 1600-*x* may transmit the "foreground image data" to the image generation apparatus 200 and the image monitoring apparatus 400.

Also in the present embodiment, the variations described in the first and second embodiments can be employed.

Next, a fourth embodiment will be described. The first embodiment has been described taking as an example a case where each image capturing apparatus 100-*x* unconditionally transmits "foreground image data" separated from "pre-foreground/background-separation image data" to the image generation apparatus 200 and the image monitoring apparatus 400. In contrast, in the present embodiment, each image capturing apparatus transmits, to the image generation apparatus 200 and the image monitoring apparatus 400, only "foreground image data" at a distance less than or equal to a predetermined value from a particular object such as a soccer ball to which the user pays attention, thereby obtaining effects comparable to those of the first embodiment while further reducing the load of the transmission band. The present embodiment and the first embodiment are thus different mainly in processing performed when each image capturing apparatus 100-*x* transmits "foreground image data". Thus, in the description of the present embodiment, portions similar to those of the first embodiment are designated by the same numerals as those in FIGS. 1 to 13, and are not described in detail.

The configuration of an image monitoring system according to the present embodiment is similar to that according to the first embodiment. Further, the configurations of a user terminal 300, an image monitoring apparatus 400, and a distribution apparatus 500 are also similar to those according to the first embodiment.

Figure 19:
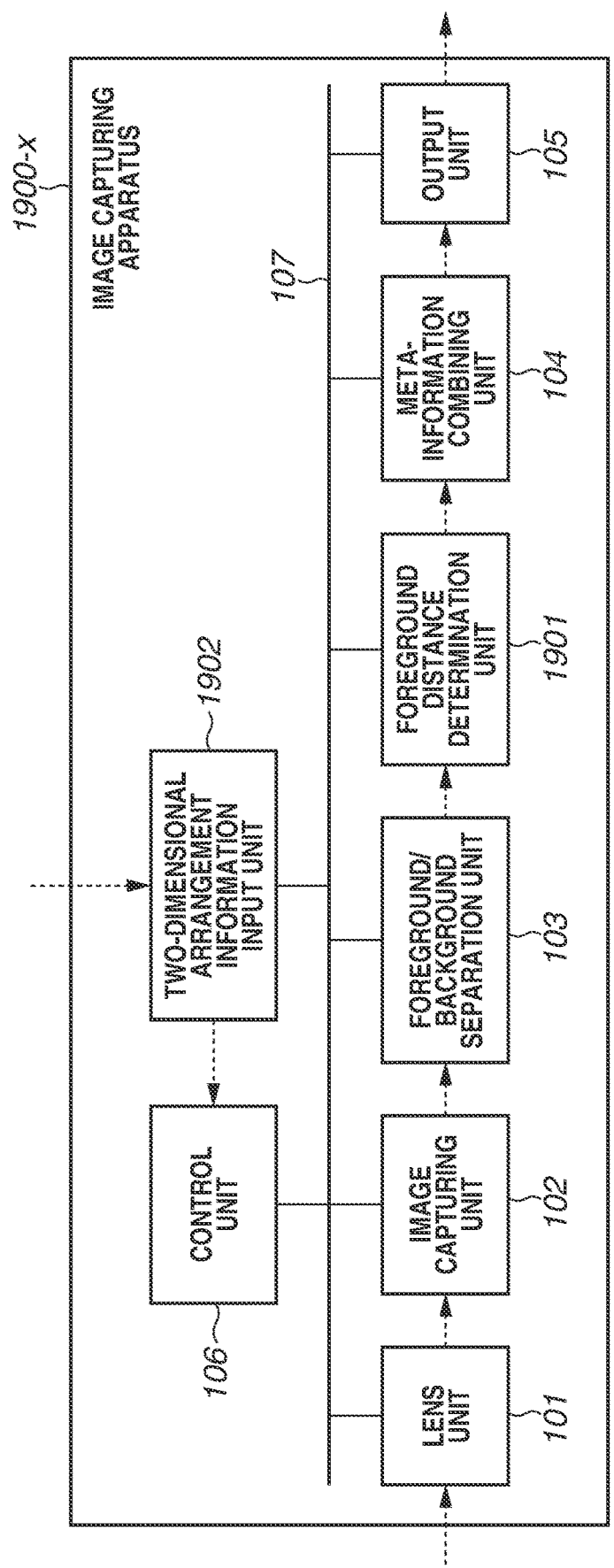
FIG. 19 is a block diagram illustrating a fourth example of the functional configuration of the image capturing apparatus.

FIG. 19 is a block diagram illustrating an example of the functional configuration of an image capturing apparatus 1900-*x* according to the present embodiment, which is contrasted with the image capturing apparatus 100-*x* according to the first embodiment illustrated in FIG. 4. The hardware of the image capturing apparatus 1900-*x* according to the present embodiment is similar to the hardware of the image capturing apparatus 100-*x* according to the first embodiment.

The image capturing apparatus 1900-*x* includes a lens unit 101, an image capturing unit 102, a foreground/background separation unit 103, a meta-information combining unit 104, an output unit 105, a control unit 106, a foreground distance determination unit 1901, and a two-dimensional arrangement information input unit 1902. These components are connected to each other by an internal bus 107 and can transmit and receive data to and from each other under control of the control unit 106. The function of the two-dimensional arrangement information input unit 1902 is achieved by, for example, the system controller 308. That is, the system controller 308 communicates with an external apparatus, thereby acquiring two-dimensional arrangement information. Further, the function of the foreground distance determination unit 1901 is achieved by, for example, the system controller 308.

In the image capturing apparatus 1900-*x*, portions other than the foreground distance determination unit 1901 and the two-dimensional arrangement information input unit 1902 are similar to those of the image capturing apparatus 100-*x*.

The foreground distance determination unit 1901 acquires, from the control unit 106, distance information regarding the distance between "foreground image data" (hereinafter referred to as a "comparison target destination object") and other particular "foreground image data" (hereinafter referred to as a "comparison target source object") as a comparison source. Based on this distance information, the foreground distance determination unit 1901 determines whether the "foreground image data" is to be output to the meta-information combining unit 104. Examples of the details of this processing will be described below. "Two-dimensional arrangement information" transmitted from a two-dimensional arrangement information output unit 2001 of an image generation apparatus 2000 is input to the two-dimensional arrangement information input unit 1902. Then, the two-dimensional arrangement information input unit 1902 outputs the "two-dimensional arrangement information" to the control unit 106. An example of the "two-dimensional arrangement information" will be described below.

Figure 20:
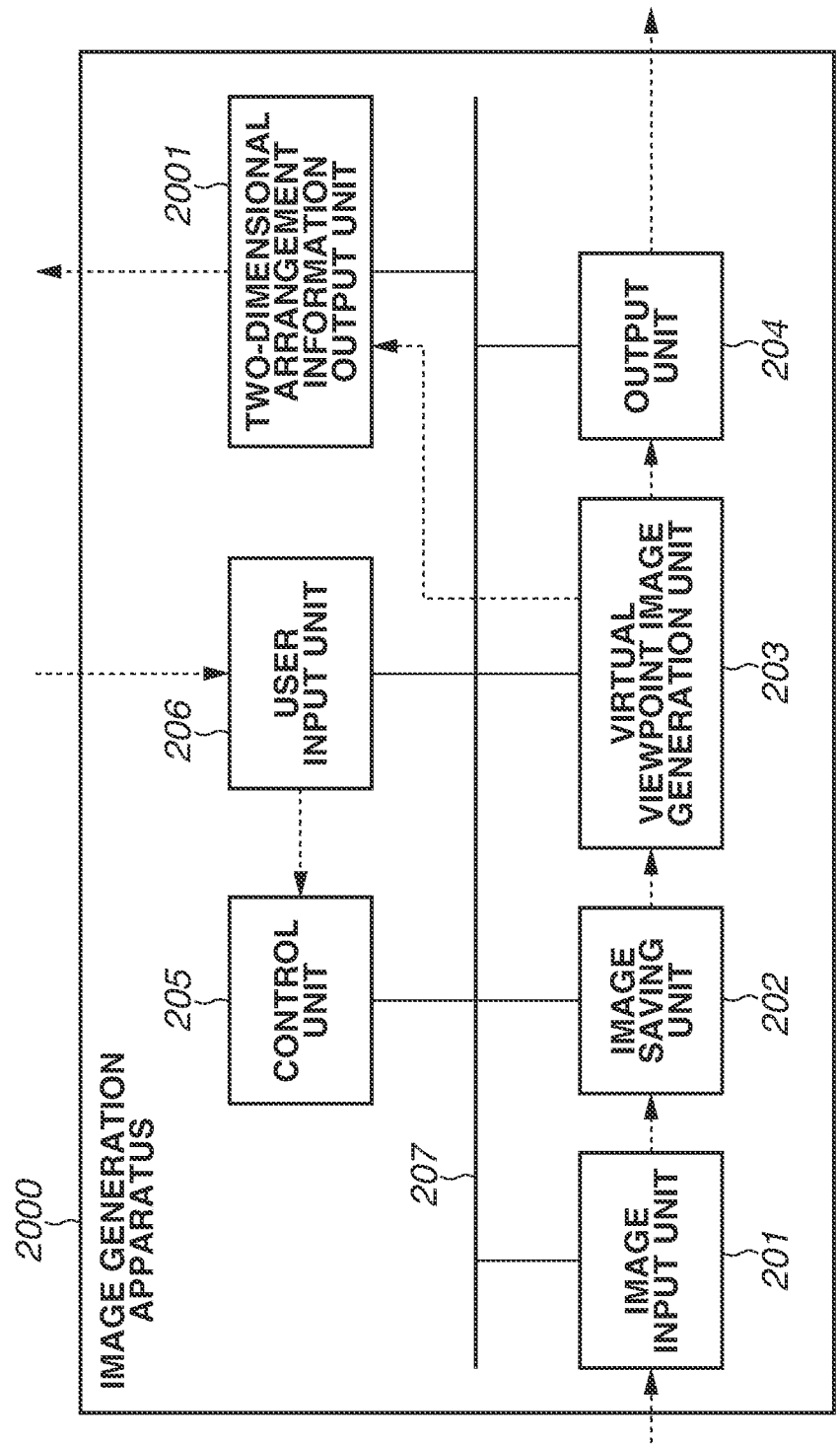
FIG. 20 is a block diagram illustrating of a second example of the functional configuration of the image generation apparatus.

FIG. 20 is a block diagram illustrating an example of the functional configuration of the image generation apparatus 2000 according to the present embodiment, which is contrasted with the image generation apparatus 200 according to the first embodiment illustrated in FIG. 8. The hardware of the image generation apparatus 2000 is similar to that of the image generation apparatus 200 according to the first embodiment. The image generation apparatus 2000 includes an image input unit 201, an image saving unit 202, a virtual viewpoint image generation unit 203, an output unit 204, a control unit 205, a user input unit 206, and a two-dimensional arrangement information output unit 2001. These components are connected to each other by an internal bus 207 and can transmit and receive data to and from each other under control of the control unit 205. The function of the two-dimensional arrangement information output unit 2001 is achieved by, for example, the communication I/F 707.

In the image generation apparatus 2000, portions other than the two-dimensional arrangement information output unit 2001 are similar to those of the image generation apparatus 200. The two-dimensional arrangement information output unit 2001 receives two-dimensional arrangement information from the virtual viewpoint image generation unit 203 and outputs the two-dimensional arrangement information to each image capturing apparatus 1900-x. Before this, the virtual viewpoint image generation unit 203 generates two-dimensional arrangement information from a three-dimensional model generated based on a plurality of captured images obtained by capturing an object from a plurality of directions.

Figure 22:
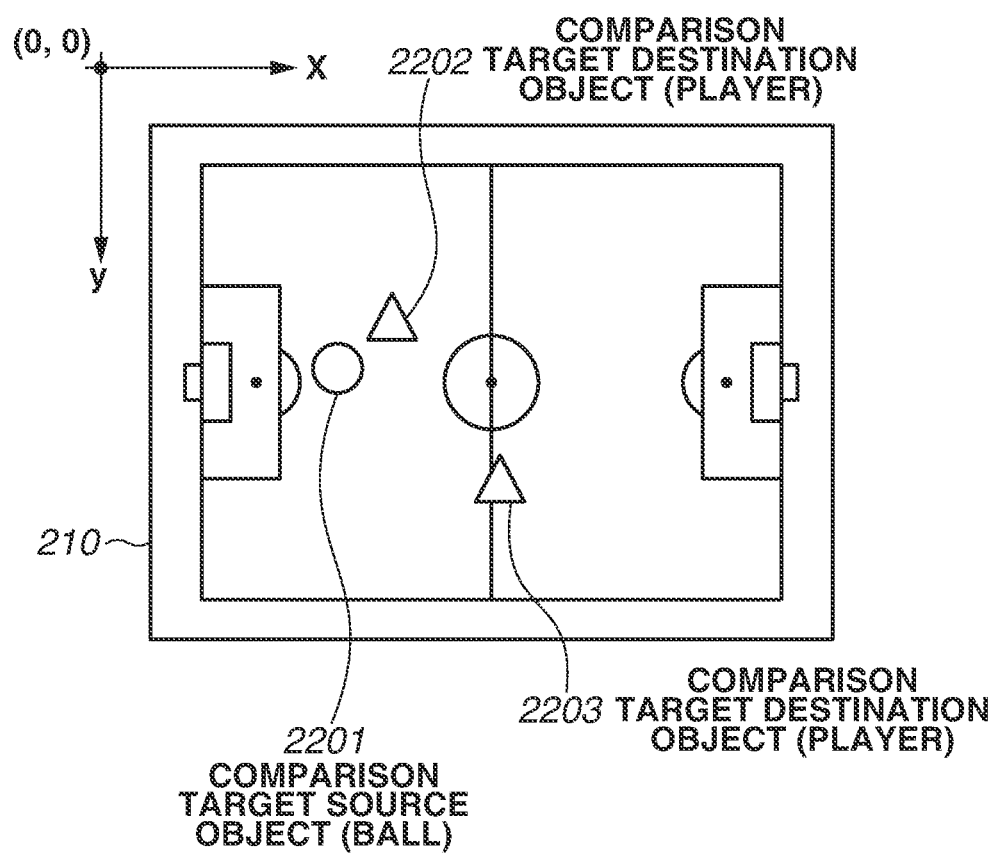
FIG. 22 is a diagram illustrating the two-dimensional arrangement information.

FIG. 21 is a diagram illustrating an example of the form of the two-dimensional arrangement information. Further, FIG. 22 is a diagram illustrating the two-dimensional arrangement information in FIG. 21, taking a soccer field as an example. The two-dimensional arrangement information includes at least the following information with respect to each piece of "foreground image data".

Foreground type
Identification information of the foreground image data
Coordinate information of the foreground image data The "foreground type" is information indicating either of a "comparison destination" and a "comparison source". In this case, the "comparison source" indicates a "comparison target source object". The "comparison destination" indicates a "comparison target destination object". In the example of FIG. 22, a comparison target source object 2201 as a "comparison source" is a ball. Further, comparison target destination objects 2202 and 2203 as "comparison destinations" are players.

The "identification information of the foreground image data" is similar to the "identification information of the foreground image data" described in the first embodiment. The "coordinate information of the foreground image data" is also similar to the "coordinate information of the foreground image data" described in the first embodiment. In the present embodiment, however, the "coordinate information of the foreground image data" may not be the coordinates of the top left corner of the rectangular "foreground image data", but may be the coordinates of the center of the rectangular "foreground image data". FIG. 21 illustrates the two-dimensional arrangement information, taking coordinate information when a captured image has 4096×2160 pixels as an example.

Figure 23:
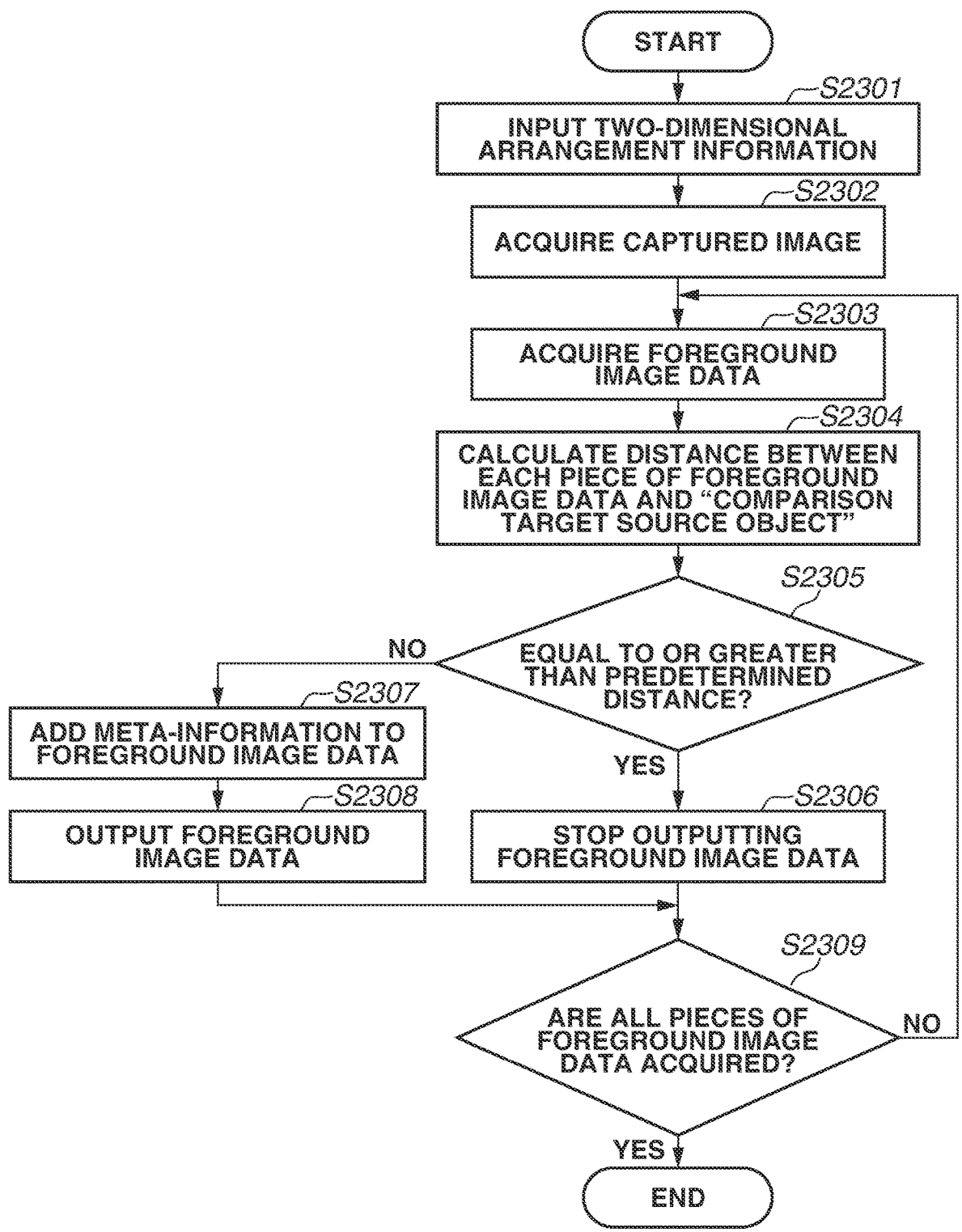
FIG. 23 is a flowchart illustrating a third example of the operation of the image capturing apparatus.

FIG. 23 is a flowchart illustrating an example of the operation of the image capturing apparatus 1900-x according to the present embodiment. The flowchart in FIG. 23 is executed, for example, every time the image capturing apparatus 1900-x obtains a captured image.

First, in step S2301, two-dimensional arrangement information is input to the control unit 106 from the image generation apparatus 2000 via the two-dimensional arrangement information input unit 1902. The two-dimensional arrangement information is input from the image generation apparatus 2000 at a predetermined frame rate.

Next, in step S2302, similarly to the first embodiment, the image capturing unit 102 acquires "pre-foreground/background-separation image data". At this time, similarly to the first embodiment, the foreground/background separation unit 103 may acquire "background image data". Next, in step S2303, the foreground/background separation unit 103 acquires a piece of "foreground image data" from the "pre-foreground/background-separation image data".

Next, in step S2304, the control unit 106 derives the distance between a comparison target source object and the foreground image data acquired by the foreground/background separation unit 103 as a comparison target destination object and outputs the derived distance to the foreground distance determination unit 1901. In step S2305, based on the distance information received from the control unit 106, the foreground distance determination unit 1901 determines whether the distance between the comparison target source object and the foreground image data (the comparison target destination object) acquired by the foreground/background separation unit 103 is equal to or greater than a predetermined distance. As a result of this determination, if the distance between the foreground image data (the comparison target destination object) and the comparison target source object is equal to or greater than the predetermined distance (YES in step S2305), then in step S2306, the control unit 106 stops outputting the "foreground image data".

If, on the other hand, the distance between the foreground image data (the comparison target destination object) and the comparison target source object is not equal to or greater than the predetermined distance (NO in step S2305), then in step S2307, the meta-information combining unit 104 adds meta-information to the "foreground image data" acquired by the foreground/background separation unit 103.

Next, in step S2308, the control unit 106 instructs the output unit 105 to output the "foreground image data". Based on this instruction, the output unit 105 outputs the "foreground image data" output from the meta-information combining unit 104, to the image generation apparatus 2000 and the image monitoring apparatus 400 at a predetermined frame rate.

As described above, in the present embodiment, the image capturing apparatus 1900-x focuses on a "comparison target source object" to which the user pays the most attention. Then, the image capturing apparatus 1900-x preferentially outputs a "comparison target destination object" located at a short distance from the "comparison target source object". Thus, the person in charge of monitoring can monitor a "comparison target destination object (foreground data)" to which the user is assumed to pay more attention. Thus, it is possible to obtain the effects described in the first embodiment while further reducing the load of the transmission band. For example, a "comparison target source object" in the playing field 210 (a soccer field) is a ball. Most users view a player as a "comparison target destination object" close to the ball. Such a player close to the ball is more preferentially monitored, whereby it is possible to both reduce the load of monitoring captured images and reduce the load of the transmission band.

Further, the present embodiment may be combined with at least either one of the second and third embodiments. In a case where the present embodiment and the second embodiment are combined together, each image capturing apparatus 1900-x transmits, among pieces of "foreground image data" at distances less than or equal to the predetermined distance from a "comparison target source object", a piece of "foreground image data" satisfying the predetermined condition regarding a size. In a case where the present embodiment and the third embodiment are combined together, each image capturing apparatus 1900-$x$ transmits, among pieces of "foreground image data" in the gaze point areas 1701 and 1702, a piece of "foreground image data" at a distance less than or equal to the predetermined distance from a "comparison target source object".

Also in the present embodiment, the variations described in the first to third embodiments can be employed.

Next, a fifth embodiment will be described. The first to fourth embodiments have been described taking as an example a case where the image monitoring apparatus 400 classifies only foregrounds captured at the same timing by the image capturing apparatuses and displays a list of the classified foregrounds. In contrast, the present embodiment is described taking as an example a case where each image capturing apparatus transmits only foreground image data to an image monitoring apparatus, and the image monitoring apparatus displays a list of images representing the same foreground as a single group. The present embodiment is different from the first to fourth embodiments mainly in the method for displaying foregrounds. Thus, in the description of the present embodiment, portions similar to those of the first to fourth embodiments are designated by the same numerals as those in FIGS. 1 to 23, and are not described in detail.

The configuration of an image monitoring system according to the present embodiment is similar to that according to the first embodiment. Further, the configurations of an image capturing apparatus 100-$x$, a user terminal 300, and a distribution apparatus 500 are similar to those according to the first embodiment. Further, an image generation apparatus 2000 is similar to that according to the fourth embodiment. The image generation apparatus 2000 and an image monitoring apparatus 2400 can transmit "two-dimensional arrangement information" via the distribution apparatus 500.

Figure 24:
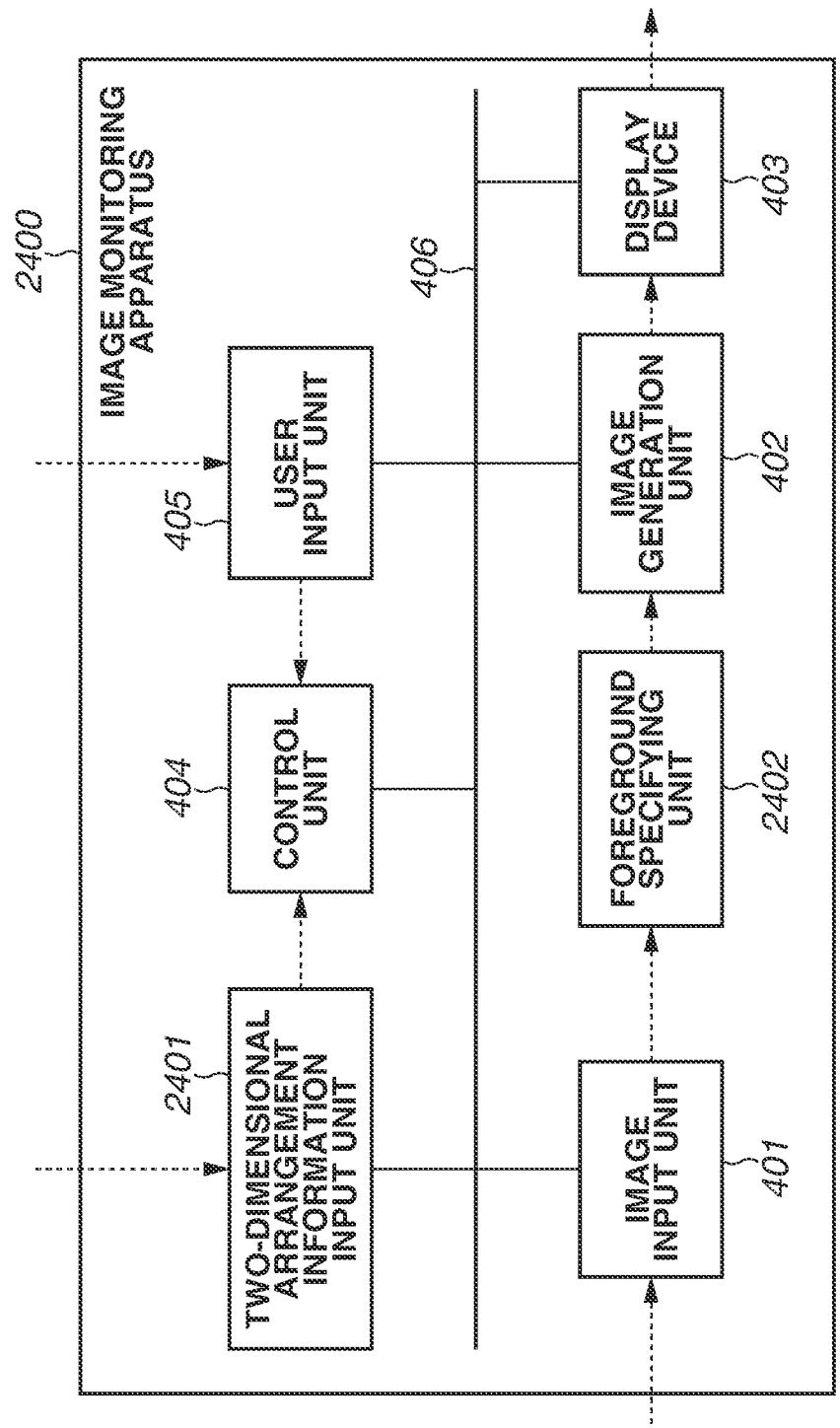
FIG. 24 is a block diagram illustrating a second example of the functional configuration of the image monitoring apparatus.

FIG. 24 is a block diagram illustrating an example of the functional configuration of an image monitoring apparatus 2400 according to the present embodiment, which is contrasted with the image monitoring apparatus 400 according to the first embodiment. The hardware of the image monitoring apparatus 2400 is similar to that of the image monitoring apparatus 400 according to the first embodiment. The image monitoring apparatus 2400 is an example of an information processing apparatus for performing processing including the classification of an image of a foreground based on meta-information. The image monitoring apparatus 2400 includes an image input unit 401, an image generation unit 402, a display unit 403, a control unit 404, a user input unit 405, a two-dimensional arrangement information input unit 2401, and a foreground specifying unit 2402. These components are connected to each other by an internal bus 406 and can transmit and receive data to and from each other under control of the control unit 404. Examples of the configurations of the components are described in detail below. In the image monitoring apparatus 2400, portions other than the two-dimensional arrangement information input unit 2401 and the foreground specifying unit 2402 are similar to those of the image monitoring apparatus 400. Further, the function of the two-dimensional arrangement information input unit 2401 is achieved by, for example, the communication I/F 707. Further, the function of the foreground specifying unit 2402 is achieved by, for example, the CPU 701.

"Two-dimensional arrangement information" transmitted from the two-dimensional arrangement information output unit 2001 of the image generation apparatus 2000 is input to the two-dimensional arrangement information input unit 2401. Then, the two-dimensional arrangement information input unit 2401 outputs the "two-dimensional arrangement information" to the control unit 404. The "two-dimensional arrangement information" is similar to that in FIG. 21 described in the fourth embodiment and includes, with respect to each piece of "foreground image data", at least a "foreground type", "identification information of the foreground image data", and "coordinate information of the foreground image data". However, the "identification information of the foreground image data" of the "two-dimensional arrangement information" includes all the pieces of "identification information of the foreground image data" added by the image capturing apparatuses 100-$x$. For example, in a case where one of pieces of "foreground image data" of the "two-dimensional arrangement information" is a soccer ball, the "identification information of the foreground image data" of the "two-dimensional arrangement information" includes all the following pieces of information. That is, the "identification information of the foreground image data" of the "two-dimensional arrangement information" includes all the pieces of "identification information of the foreground image data" added to the "foreground image data" of the soccer ball by the image capturing apparatuses 100-$x$. Further, the control unit 404 according to the present embodiment outputs the "two-dimensional arrangement information" input from the two-dimensional arrangement information input unit 2401, as it is to the foreground specifying unit 2402.

Based on the "two-dimensional arrangement information" output from the control unit 404, all the pieces of "foreground image data" of the image capturing apparatuses 100-$x$ output from the image input unit 401, and the pieces of meta-information added to all the pieces of "foreground image data", the foreground specifying unit 2402 specifies which pieces of "foreground image data" represent the same foreground. For example, in a case where pieces of "foreground image data" of the soccer ball are included in captured images of the respective image capturing apparatuses 100-$x$, the foreground specifying unit 2402 specifies these pieces of "foreground image data" as the same foreground. The foreground specifying unit 2402 adds common identification information to the pieces of "foreground image data" specified as the same foreground and outputs the pieces of "foreground image data" to the image generation unit 402. Further, in the present embodiment, the following display image type is included.

Foreground group display image

Figure 25:
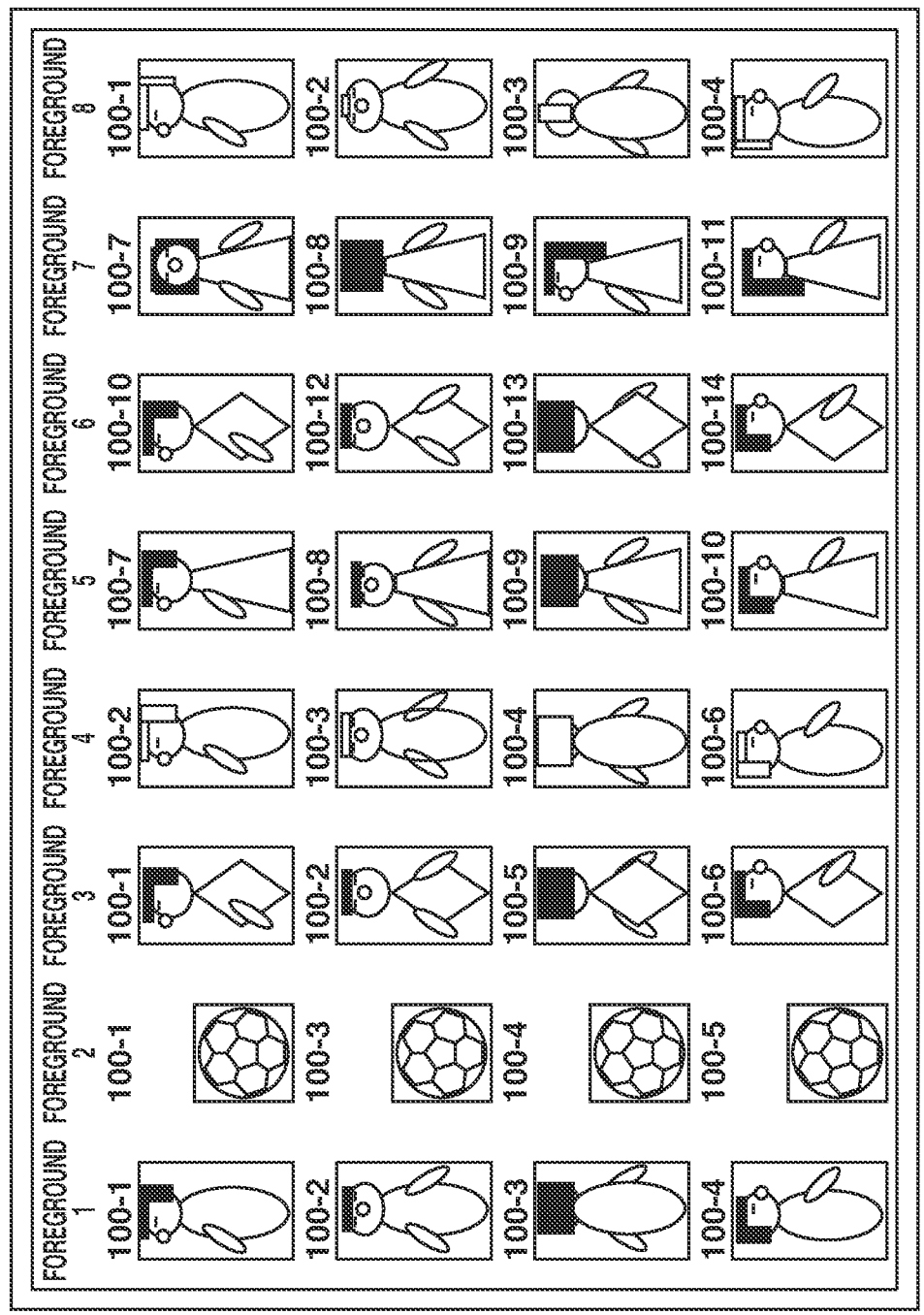
FIG. 25 is a diagram illustrating a second example of the display image displayed on the image monitoring apparatus.

Next, an example of the operation of the image monitoring apparatus 2400 according to the present embodiment will be described. FIG. 25 is a diagram illustrating an example of a display image to be displayed on the image monitoring apparatus 2400 according to the present embodiment. The display unit 403 displays a list of only foregrounds captured at the same timing by the image capturing apparatuses 100-$x$ and updates the display image in the same cycle as that of a synchronization signal from the synchronization apparatus (not illustrated). That is, the display unit 403 displays as a moving image a list of captured images (pieces of "foreground image data") obtained by subtracting "background image data" from "pre-foreground/background-separation image data" with respect to each image capturing apparatus 100-$x$. FIG. 25 illustrates as an example a case where a list of pieces of "foreground image data" the foreground types of which are "foreground 1" to "foreground 8" is displayed as groups such that the same foreground type forms the same group. In FIG. 25, the foreground 2 is a ball. The other foregrounds are particular people.

Figure 26:
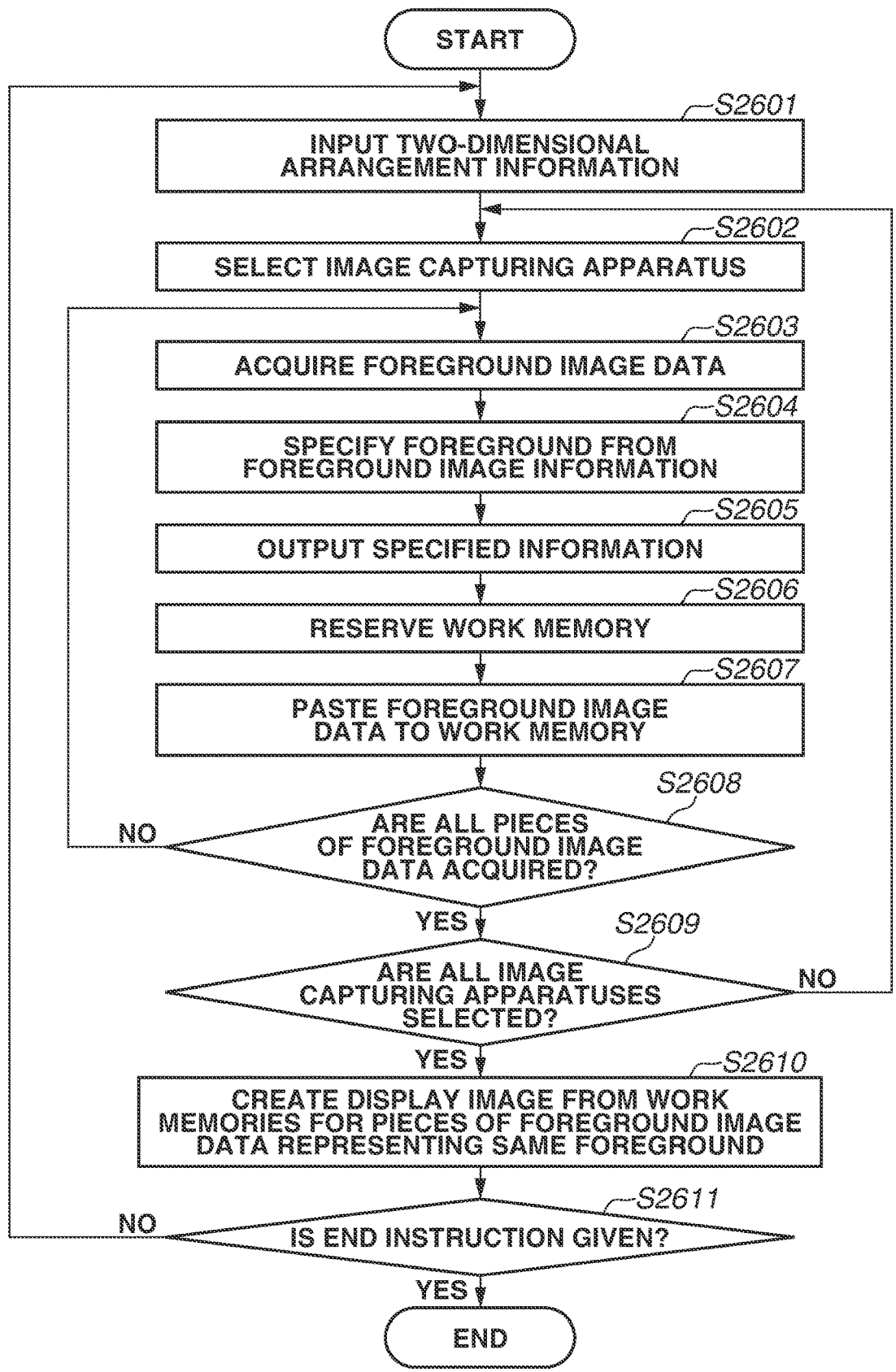
FIG. 26 is a flowchart illustrating a second example of the process of generating the display image.

Next, an example of the processing of the image monitoring apparatus 2400 when generating the display image will be described taking as an example a case where the display image type is the "foreground group display image". FIG. 26 is a flowchart illustrating an example of the processing of the image monitoring apparatus 2400 when generating the display image.

In step S2601, "two-dimensional arrangement information" is input to the foreground specifying unit 2402 via the control unit 404.

Next, in step S2602, the image generation unit 402 selects an image capturing apparatus 100-$x$ that has not yet been selected among the image capturing apparatuses 100-$x$. Next, in step S2603, the image generation unit 402 acquires, from the image input unit 401, a piece of "foreground image data" that has not yet been selected in "foreground image data" of the image capturing apparatus 100-$x$ selected in step S2602, and a piece of meta-information of the piece of "foreground image data".

Next, in step S2604, the foreground specifying unit 2402 specifies which "foreground image data" of the "two-dimensional arrangement information" the "foreground image data" is. As described above, the "identification information of the foreground image data" of the "two-dimensional arrangement information" according to the present embodiment includes all the pieces of "identification information of the foreground image data" added by the image capturing apparatuses 100-$x$. Based on the "identification information of the foreground image data", the foreground specifying unit 2402 specifies the relationship between the "foreground image data" acquired in step S2603 and the "two-dimensional arrangement information".

Next, in step S2605, the foreground specifying unit 2402 outputs, to the image generation unit 402, information indicating the content specified in step S2604.

Next, in step S2606, the image generation unit 402 reserves a work memory with respect to each piece of "foreground image data". In step S2607, the image generation unit 402 pastes the "foreground image data" acquired in step S2603 to the work memory. This work memory has a size capable of reproducing resolution and color depth equivalent to those of a captured image of each image capturing apparatus 100-$x$. Further, the "foreground image data" according to the present embodiment is a raw image. Thus, the image generation unit 402 performs a development process on the "foreground image data" and pastes the "foreground image data" subjected to the development process to the work memory.

The processes of steps S2603 to S2607 are also repeatedly performed on the remaining pieces of "foreground image data" of the image capturing apparatus 100-$x$ selected in step S2602. Thus, the image generation unit 402 determines whether all the pieces of "foreground image data" of the image capturing apparatus 100-$x$ selected in step S2602 are pasted to the work memories. As a result of this determination, if not all the pieces of "foreground image data" of the image capturing apparatus 100-$x$ selected in step S2602 are pasted to the work memories (NO in step S2608), the processing returns to step S2603. Then, the processes of steps S2603 to S2608 are repeatedly executed until all the pieces of "foreground image data" of the image capturing apparatus 100-$x$ selected in step S2602 are pasted to the work memories. If all the pieces of "foreground image data" of the image capturing apparatus 100-$x$ selected in step S2602 are pasted to the work memories (YES in step S2608), the processing proceeds to step S2609.

Then, in step S2609, the image generation unit 402 determines whether all the pieces of "foreground image data" of all the image capturing apparatuses 100-$x$ set in advance for the image monitoring apparatus 2400 are pasted to the work memories. As a result of this determination, if not all the pieces of "foreground image data" of all the image capturing apparatuses 100-$x$ set in advance for the image monitoring apparatus 2400 are pasted to the work memories (NO in step S2609), the processing returns to step S2602. Then, the processes of steps S2602 to S2609 are repeatedly executed until all the pieces of "foreground image data" of all the image capturing apparatuses 100-$x$ set in advance for the image monitoring apparatus 2400 are pasted to the work memories. If all the pieces of "foreground image data" of all the image capturing apparatuses 100-$x$ set in advance for the image monitoring apparatus 2400 are pasted to the work memories (YES in step S2609), the processing proceeds to step S2610.

In step S2610, the image generation unit 402 collectively transfers captured images (pieces of "foreground image data") specified as the same foreground and reproduced in the work memories to the frame buffer of the display unit 403, thereby creating a display image. At this time, according to the size of the frame buffer of the display unit 403, the image generation unit 402 performs a reduction process on the captured images (the pieces of "foreground image data"). As described above, FIG. 25 illustrates an example of the display image created in the frame buffer.

The processes of steps S2601 to S2610 are finished at least within the period of the frame rate of the "foreground image data" input from the image input unit 401. Then, in step S2611, the image generation unit 402 determines whether an end instruction is given by the control unit 404. As a result of this determination, if an end instruction is given by the control unit 404 (YES in step S2611), the processing of the flowchart in FIG. 26 ends. If, on the other hand, an end instruction is not given by the control unit 404 (NO in step S2611), and if the period of the frame rate of the "foreground image data" ends, the processing returns to step S2601. Then, the processes of steps S2601 to S2611 are repeated.

As described above, also in a case where images representing the same foreground are collectively displayed as a single group, it is possible to obtain the effects described in the first embodiment.

The present embodiment has been described taking as an example a case where the image capturing apparatus 100-$x$ according to the first embodiment is used. Alternatively, the image capturing apparatuses 1400-$x$, 1600-$x$, and 1900-$x$ according to the second to fourth embodiments may be used.

Also in the present embodiment, the variations described in the first to fourth embodiments can be employed.

The above embodiments merely illustrate specific examples for carrying out the present invention, and the technical scope of the present invention should not be interpreted in a limited manner based on these embodiments. That is, the present invention can be carried out in various manners without departing from the technical idea or the main feature of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Based on the system according to the present embodiment, it is possible to reduce the burden of monitoring a plurality of captured images, while monitoring the captured images with high accuracy.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-022717, filed Feb. 10, 2017, which is hereby incorporated by reference herein in its entirety.

What is claimed is:

1. An information processing apparatus comprising:
one or more memories storing instructions; and
one or more processors executing the instructions to:
obtain a plurality of object images, wherein an object image among the plurality of object images represents an area of an object, is extracted from a captured image among a plurality of captured images obtained by a plurality of image capturing apparatuses, and is used for generating an image corresponding to a virtual viewpoint; and
cause a display device to display, on a display screen, the obtained plurality of object images so that a first object image is displayed with identification information for identifying a first image capturing apparatus within a first display area on the display screen, which is allocated to the first image capturing apparatus, and a second object image is displayed with identification information for identifying a second image capturing apparatus within a second display area on the display screen, which is allocated to the second image capturing apparatus, wherein the first object image is extracted from a captured image obtained by the first image capturing apparatus among the plurality of image capturing apparatuses, and the second object image is extracted from a captured image obtained by the second image capturing apparatus among the plurality of the image capturing apparatuses,
wherein the object is a target for generating three-dimensional shape data based on the plurality of the captured images.

2. The information processing apparatus according to claim 1, wherein an object image whose spatial size in a captured image is within a predetermined size range is displayed and an object image whose spatial size in a captured image is not within the predetermined size range is not displayed.

3. The information processing apparatus according to claim 2, wherein the object image whose spatial size in the captured image is within the predetermined size range is obtained and the object image whose spatial size in the captured image is not within the predetermined size range is not obtained.

4. The information processing apparatus according to claim 1,
wherein the plurality of image capturing apparatuses are classified into a plurality of groups at least including a first group and a second group, and
wherein an object image extracted from captured images obtained by one or more image capturing apparatuses belonging to the first group is displayed and an object image extracted from captured images obtained by one or more image capturing apparatuses belonging to the second group is not displayed.

5. The information processing apparatus according to claim 4, wherein the object image extracted from the captured images obtained by the one or more image capturing apparatuses belonging to the first group is obtained and docs not obtain the object image extracted from the captured images obtained by the one or more image capturing apparatuses belonging to the second group is not obtained.

6. The information processing apparatus according to claim 4,
wherein the one or more processors further execute the instructions to decide the first group among the plurality of groups, and
wherein the object image in the captured images obtained by the one or more image capturing apparatuses belonging to the first group is displayed.

7. The information processing apparatus according to claim 6, wherein the first group is decided based on designation by a person.

8. The information processing apparatus according to claim 6, wherein the first group is decided based on a number of objects included in an area captured by each of the groups.

9. The information processing apparatus according to claim 6, wherein the first group is decided based on a specific object being included in an area captured by each of the groups.

10. The information processing apparatus according to claim 4, wherein an image capturing apparatus belonging to the first group is an image capturing apparatus for capturing a first point and an image capturing apparatus belonging to the second group is an image capturing apparatus for capturing a second point different from the first point.

11. The information processing apparatus according to claim 1, wherein an object image whose object is located within a predetermined distance from a particular object in a captured image is displayed and an object image whose object is not located within the predetermined distance from the particular object in the captured image is not displayed.

12. The information processing apparatus according to claim 11, wherein the object image whose object is located within the predetermined distance from the particular object in the captured image is obtained and the object image whose object is not located within the predetermined distance from the particular object in the captured image is not obtained.

13. The information processing apparatus according to claim 1,
wherein identification information for identifying an object corresponding to the object image is obtained, and
wherein the object image is displayed in an arrangement according to the identification information.

14. The information processing apparatus according to claim 1, wherein the obtained object image is displayed in an arrangement according to a type of the object image.

15. The information processing apparatus according to claim 1,
wherein identification information for identifying an image capturing apparatus corresponding to the object image is obtained, and
wherein the object image is displayed in an arrangement according to the identification information.

16. The information processing apparatus according to claim 1, wherein the object comprises a moving object.

17. The information processing apparatus according to claim 1, wherein a position of an object in the first area corresponds to a position of an object in the captured image obtained by the first image capturing apparatus, and a position of an object in the second area corresponds to a position of an object image in the captured image obtained by the second image capturing apparatus.

18. The information processing apparatus according to claim 1, wherein a position of an object in the first area is displayed according to coordinate information indicating a display location of the object image on the captured image obtained by the first image capturing apparatus, and a position of an object in the second area is displayed according to coordinate information indicating a display location of the object image on the captured image obtained by the second image capturing apparatus.

19. The information processing apparatus according to claim 1, wherein a background image which is included in the captured image and represents an area different from the area of the object is not displayed on the display screen.

20. The information processing apparatus according to claim 1, wherein the background image is not obtained.

21. An image processing method comprising:
obtaining a plurality of object images, wherein an object image among the plurality of object images represents an area of an object, is extracted from a captured image among a plurality of captured images obtained by a plurality of image capturing apparatuses, and is used for generating an image corresponding to a virtual viewpoint; and displaying, on a display screen, the obtained plurality of object images so that a first object image is displayed with identification information for identifying a first image capturing apparatus within a first display area on the display screen, which is allocated to a first image capturing apparatus, and a second object image is displayed with identification information for identifying a second image capturing apparatus within a second display area on the display screen, which is allocated to the second image capturing apparatus, wherein the first object image is extracted from a captured image obtained by the first image capturing apparatus among the plurality of image capturing apparatuses, and the second object image is extracted from a captured image obtained by the second image capturing apparatus among the plurality of image capturing apparatuses, wherein the object is a target for generating three-dimensional shape data based on the plurality of captured images.

22. A non-transitory computer-readable storage medium storing instructions that, in a case where executed, cause a computer to execute an image processing method comprising:
obtaining a plurality of object images, wherein an object image among the plurality of object images represents an area of an object, is extracted from a captured image among a plurality of captured images obtained by the plurality of image capturing apparatuses, and is used for generating an image corresponding to a virtual viewpoint; and displaying on a display screen the obtained plurality of object images so that a first object image is displayed with identification information for identifying a first image capturing apparatus within a first display area on the display screen, which is allocated to the first image capturing apparatus, and a second object image is displayed with identification information for identifying a second image capturing apparatus within a second display area on the display screen, which is allocated to the second image capturing apparatus, wherein the first object image is extracted from a captured image obtained by the first image capturing apparatus among the plurality of image capturing apparatuses, and the second object image is extracted from a captured image obtained by the second image capturing apparatus among the plurality of image capturing apparatuses, wherein the object is a target for generating three-dimensional shape data based on the plurality of captured images.

* * * * *